(12) United States Patent
Sato

(10) Patent No.: US 10,715,590 B2
(45) Date of Patent: Jul. 14, 2020

(54) NON-TRANSITORY COMPUTER-READABLE STORAGE MEDIUM, PROCESS DISTRIBUTION APPARATUS AND PROCESS DISTRIBUTION METHOD

(71) Applicant: FUJITSU LIMITED, Kawasaki-shi, Kanagawa (JP)

(72) Inventor: Masahiro Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 24 days.

(21) Appl. No.: 16/175,911

(22) Filed: Oct. 31, 2018

(65) Prior Publication Data

US 2019/0141123 A1 May 9, 2019

(30) Foreign Application Priority Data

Nov. 6, 2017 (JP) ................................. 2017-213768

(51) Int. Cl.
*H04L 29/08* (2006.01)
*H04L 12/26* (2006.01)
*G06F 9/50* (2006.01)
*G06F 9/455* (2018.01)

(52) U.S. Cl.
CPC ...... *H04L 67/1031* (2013.01); *G06F 9/45558* (2013.01); *G06F 9/50* (2013.01); *H04L 43/0876* (2013.01); *H04L 43/16* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2012/0030672 A1* | 2/2012 | Zygmuntowicz | G06F 8/60 718/1 |
| 2012/0084389 A1* | 4/2012 | Imai | G06F 9/5077 709/217 |
| 2013/0343207 A1* | 12/2013 | Cook | H04L 43/0852 370/252 |

(Continued)

FOREIGN PATENT DOCUMENTS

| | | |
|---|---|---|
| JP | 2012-221049 | 11/2012 |
| JP | 2014-056335 | 3/2014 |

*Primary Examiner* — Scott B Christensen
(74) *Attorney, Agent, or Firm* — Fujitsu Patent Center

(57) ABSTRACT

A non-transitory computer-readable storage medium storing a program that causes a computer to execute a process including acquiring, for each of a plurality of applications executed on a plurality of virtual machines, an amount of traffic of packets transmitted to any of a plurality of CPUs, identifying, for each of the plurality of applications, a CPU to which packets are transmitted, calculating, for each of the plurality of CPUs, a total amount of traffic of packets that are received by the CPU, identifying, among the plurality of CPUs, a specific CPU of which the calculated total amount exceeds a predetermined threshold, identifying, among applications those transmit packets to the specific CPU, a specific application, and identifying, among the plurality of virtual machines, a specific virtual machine, a CPU to which packets are transmitted from the specific application being changed by moving the specific application to the specific virtual machine.

11 Claims, 25 Drawing Sheets

(56) References Cited

U.S. PATENT DOCUMENTS

| | | | |
|---|---|---|---|
| 2014/0181297 A1* | 6/2014 | Nakatsugawa | H04L 43/0876 709/224 |
| 2015/0234668 A1* | 8/2015 | Ravinoothala | G06F 9/45558 718/1 |
| 2016/0212237 A1* | 7/2016 | Nishijima | H04L 45/22 |
| 2017/0123941 A1* | 5/2017 | Yubamoto | G06F 11/20 |
| 2018/0121231 A1* | 5/2018 | Iwai | G06F 9/45558 |

* cited by examiner

FIG. 8

| DA-IP | SA-IP | DA-PORT | SA-PORT | |
|---|---|---|---|---|
| 10.0.1.1 | 10.0.0.1 | 50 | 1000 | DATA |

FIG. 20

| ITEM NUMBER | VMID | VCPU AVAILABLE AMOUNT (PCS) | MEMORY AVAILABLE AMOUNT (Mb) |
|---|---|---|---|
| 1 | VM31a | 2 | 3 |
| 2 | VM32a | 3 | 4 |
| 3 | VM33a | 2 | 2 |

FIG. 21

| ITEM NUMBER | VCPUID | APP ID | TRAFFIC AMOUNT (Mb/s) | VCPU USAGE AMOUNT (PCS) | MEMORY USAGE AMOUNT (Mb) | VMID |
|---|---|---|---|---|---|---|
| 1 | VCP0 | AP11 | 60 | 1 | 0.5 | VM31a |
| 2 | VCP0 | AP12 | 30 | 1 | 0.5 | VM31a |
| 3 | VCP0 | AP13 | 50 | 1 | 0.5 | VM31a |

FIG. 22

| ITEM NUMBER | VCPUID | TRAFFIC AMOUNT (Mb/s) | THRESHOLD (Mb/s) |
|---|---|---|---|
| 1 | VCP0 | 140 | 100 |
| 2 | VCP1 | 0 | 100 |

FIG. 23

| ITEM NUMBER | VCPUID | TRAFFIC AMOUNT (Mb/s) | THRESHOLD (Mb/s) |
|---|---|---|---|
| 1 | VCP0 | 80 | 100 |
| 2 | VCP1 | 60 | 100 |

FIG. 24

| ITEM NUMBER | VMID | VCPU AVAILABLE AMOUNT (PCS) | MEMORY AVAILABLE AMOUNT (Mb/s) |
|---|---|---|---|
| 1 | VM31a | <u>3</u> | <u>3.5</u> |
| 2 | VM32a | 2 | <u>3.5</u> |
| 3 | VM33a | 2 | 2 |

FIG. 25

| ITEM NUMBER | VCPUID | APP ID | TRAFFIC AMOUNT (Mb/s) | VCPU USAGE AMOUNT (PCS) | MEMORY USAGE AMOUNT (Mb) | VMID |
|---|---|---|---|---|---|---|
| 1 | VCP0 | AP11 | 60 | 1 | 0.5 | VM32a |
| 2 | VCP0 | AP12 | 30 | 1 | 0.5 | VM31a |
| 3 | VCP0 | AP13 | 50 | 1 | 0.5 | VM31a |

NON-TRANSITORY COMPUTER-READABLE STORAGE MEDIUM, PROCESS DISTRIBUTION APPARATUS AND PROCESS DISTRIBUTION METHOD

CROSS-REFERENCE TO RELATED APPLICATION

This application is based upon and claims the benefit of priority of the prior Japanese Patent Application No. 2017-213768, filed on Nov. 6, 2017, the entire contents of which are incorporated herein by reference.

FIELD

The embodiment discussed herein is related to a non-transitory computer-readable storage medium, a process distribution apparatus and process distribution method.

BACKGROUND

Business entities that provide cloud services using virtual machines (VMs) (hereinafter also called cloud providers) provide cloud services, such as Platform as a Service (PaaS) and Infrastructure as a Service (IaaS), to users who build information processing systems in accordance with their purposes (hereinafter also called cloud users).

Cloud services as mentioned above, for example, are each provided on physical machines deployed in different data centers. Therefore, when an information processing system using a plurality of cloud services is built, communication between cloud services is performed via an outside network (hereinafter also simply called a network), such as the Internet.

Accordingly, a cloud provider, for example, deploys a virtual machine for a gateway (this virtual machine is hereinafter also simply called a GW virtual machine) in each of data centers that provide cloud services, and performs communication between cloud services via a virtual private network (VPN). This enables the cloud provider to ensure the security of communication between cloud services even when a business system using a plurality of cloud services is built (for example, refer to Japanese Laid-open Patent Publication No. 2012-221049 and Japanese Laid-open Patent Publication No. 2014-056335).

SUMMARY

According to an aspect of the embodiments, a non-transitory computer-readable storage medium storing a program that causes a computer to execute a process, the process including acquiring, at a predetermined interval, for each of a plurality of applications executed on a plurality of virtual machines, an amount of traffic of packets transmitted to any of a plurality of central computing units (CPUs), identifying, for each of the plurality of applications, a CPU to which packets are transmitted, the CPU to which packets are transmitted being determined in accordance with a hash value calculated based on a transmission source address and a transmission destination address of each of the packets, the transmission source address varying depending on a virtual machine, among the plurality of virtual machines, on which the application corresponding to each of the packets is executed, calculating, for each of the plurality of CPUs, a total amount of traffic of packets that are received by the CPU by summing the amount of the traffic corresponding to one or more applications, among the plurality of applications, those transmit packets to the CPU, identifying, among the plurality of CPUs, a specific CPU of which the calculated total amount exceeds a predetermined threshold, identifying, among applications those transmit packets to the specific CPU, a specific application, identifying, among the plurality of virtual machines, a specific virtual machine, a CPU to which packets are transmitted from the specific application being changed by moving the specific application to the specific virtual machine, and moving the specific application to the specific virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an outline of a process for process distribution in a first embodiment;

FIG. 20 is a diagram illustrating a specific example of virtual machine information;

FIG. 21 is a diagram illustrating a specific example of application information;

FIG. 22 is a diagram illustrating a specific example of GW information;

FIG. 23 is a diagram illustrating a specific example of GW information;

FIG. 24 is a diagram illustrating a specific example of virtual machine information; and FIG. 25 is a diagram illustrating a specific example of application information.

DESCRIPTION OF EMBODIMENTS

On each GW mentioned above, for example, software (for example, receive side scaling (RSS)) runs. The software distributes packets transmitted from each cloud service (a virtual machine that provides each cloud service) in accordance with a hash value calculated from the transmission source IP address and the like of each packet. This enables each GW, for example, to cause virtual central processing units (CPUs) (hereinafter also called virtual central computing units (VCPUs)) assigned to the GW to perform processes corresponding to packets transmitted from each cloud service in such a manner that the processes are distributed among the VCPUs.

However, in some cases, packets transmitted from each cloud service are unevenly distributed among the VCPUs according to the transmission source IP address and the like of each packet. Therefore, in such a case, each GW is unable to efficiently perform processes corresponding to packets transmitted from each cloud service.

To address this, the cloud provider changes a hash value calculated from each packet by intentionally changing the transmission source IP address and the like of the packet, thereby changing the VCPU that performs a process corresponding to the packet.

However, to change the transmission source IP address and the like of each packet, for example, making a modification or the like to an application produced by a cloud user (tenant) becomes required. Therefore, in some cases, the cloud provider is unable to easily change the VCPUs that are packet distribution destinations.

Accordingly, the embodiments disclosed herein provide techniques to enable CPUs serving as packet distribution destinations to be changed.

Configuration of Information Processing System

Figure 1:
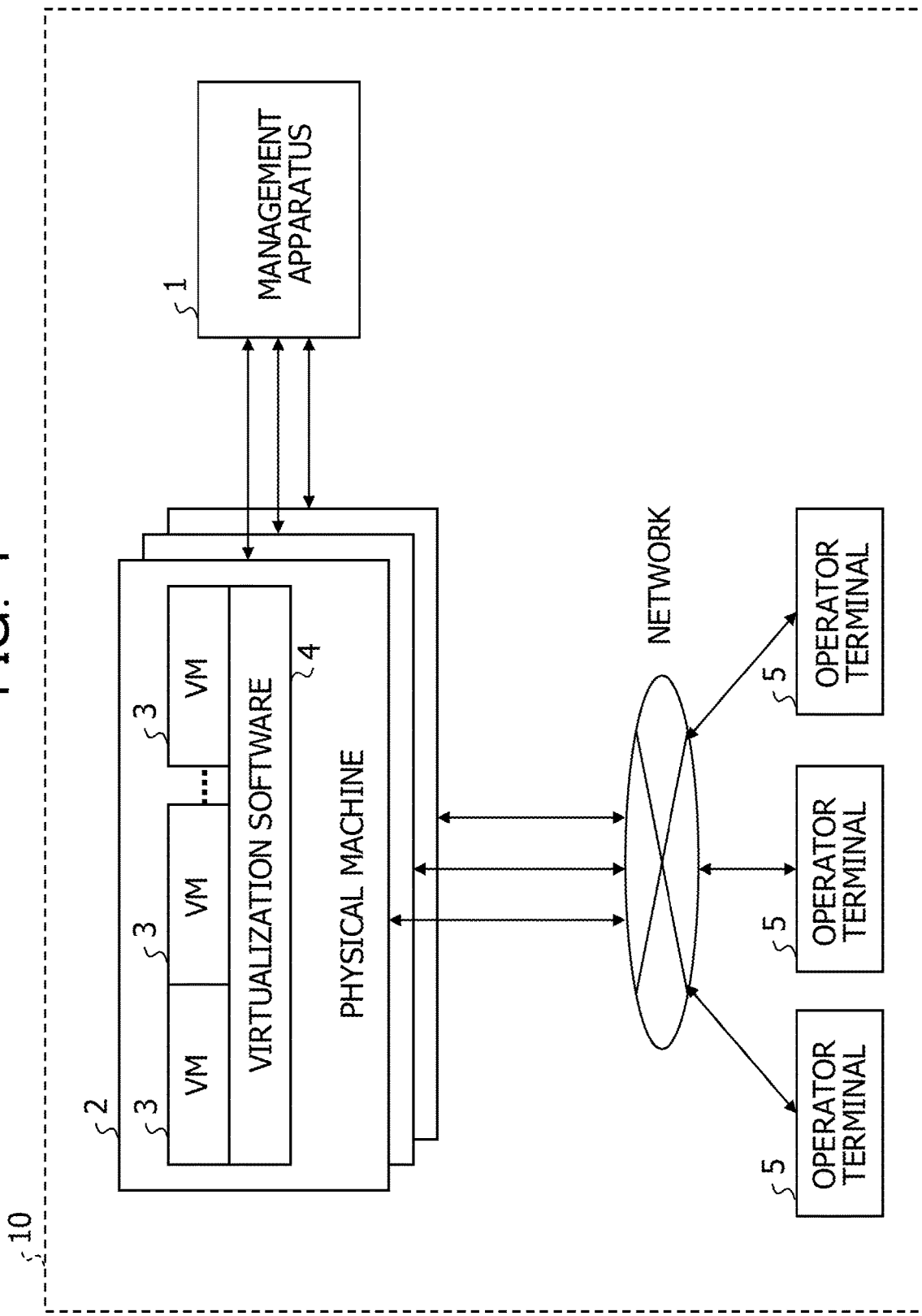
FIG. 1 is a diagram illustrating an overall configuration of an information processing system.

FIG. 1 is a diagram illustrating an overall configuration of an information processing system 10. The information processing system 10 illustrated in FIG. 1 includes a management apparatus 1, physical machines 2, and operator terminals 5.

The operator terminals 5 are, for example, one or more terminals with which a cloud provider performs various types of operations and are terminals that access the management apparatus 1 and the physical machines 2 via networks, such as the Internet and an intranet.

The physical machine 2 is implemented with one or more physical machines and includes, for example, a CPU, a memory (dynamic random access memory (DRAM)), a hard disk drive (HDD), and the like. The physical resources (hereinafter also simply called resources) of the physical machine 2 are assigned to a plurality of virtual machines 3 that execute processes.

Virtualization software 4 (hereinafter also called a hypervisor 4) is infrastructure software that creates the virtual machines 3 by assigning the CPU, the memory, the hard disk, and the like of the physical machine 2. As illustrated in FIG. 1, the virtualization software 4, for example, runs on the physical machines 2.

The management apparatus 1 performs, for example, movement (migration) for an application running on each virtual machine 3. The management apparatus 1 is, for example, implemented with one or more physical machines.

The management apparatus 1 is, for example, implemented with some of the virtual machines 3 that run on the physical machines 2.

Specific Example of Processing in Virtual Machine

Figure 2:
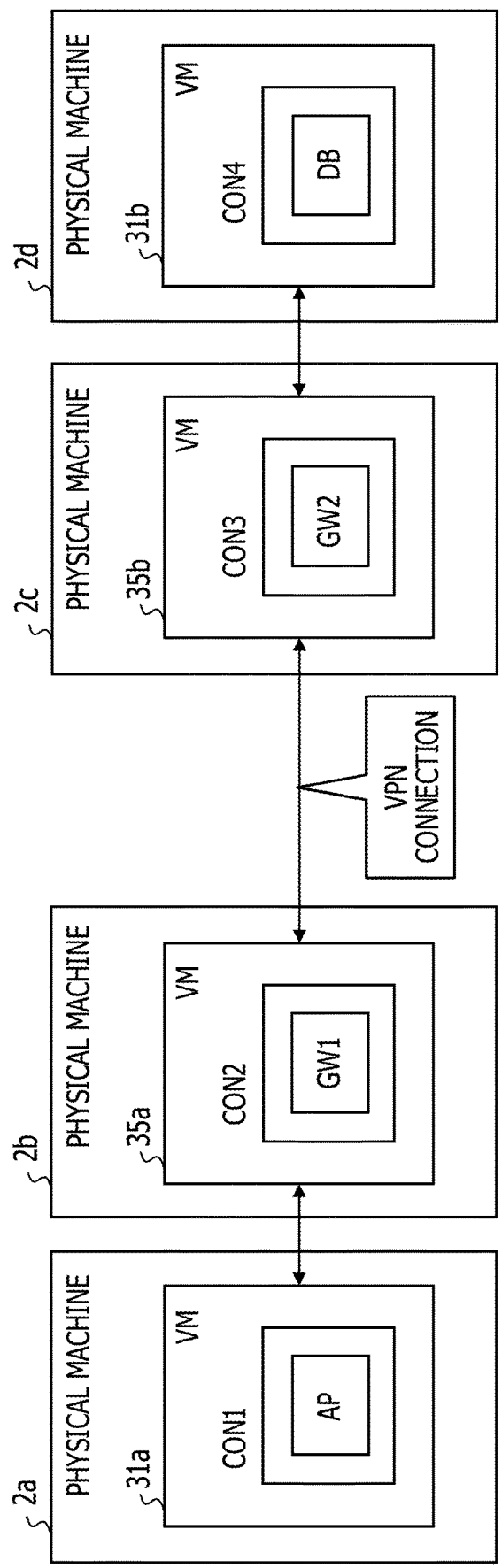
FIG. 2 is a diagram illustrating a specific example of processing in a virtual machine.

A specific example of processing in the virtual machine 3 will now be described. FIG. 2 is a diagram illustrating a specific example of processing in the virtual machine 3. Description will be given hereinafter assuming that the physical machine 2 described with reference to FIG. 1 includes a physical machine 2a and a physical machine 2b, which provide services of PaaS (for example, Cloud Foundry), and a physical machine 2c and a physical machine 2d, which provide services of IaaS.

In the example illustrated in FIG. 2, a virtual machine 31a is created in the physical machine 2a and a virtual machine 35a is created in the physical machine 2b. A virtual machine 35b is created in the physical machine 2c and a virtual machine 31b is created in the physical machine 2d. Containers CON1, CON2, CON3, and CON4 are created in the virtual machines 31a, 35a, 31b, and 35b, respectively.

In the container CON1 created in the virtual machine 31a, an application (hereinafter also simply called an AP) that performs processes is running. In the container CON4 created in the virtual machine 31b, for example, a database (hereinafter also simply called a DB) in which various types of information referenced by the AP is stored is constructed.

For example, in some cases, communication between the virtual machine 31a and the virtual machine 31b is made via an outside network, such as the Internet, because of the locations where the physical machine 2a and the physical machine 2d are deployed. Therefore, as illustrated in FIG. 2, the cloud provider, for example, runs gateways (hereinafter also simply called a GW1 and a GW2) for establishing VPN connection between the virtual machine 31a (AP) and the virtual machine 31b (DB) respectively in the container CON2 created in the virtual machine 35a and in the container CON 3 created in the virtual machine 35b.

This may enable the cloud provider to ensure the security of communication between the virtual machine 31a and the virtual machine 31b even when communication between the virtual machine 31a and the virtual machine 31b is made via an outside network, such as the Internet. Hereinafter, the virtual machine 3 that runs as a gateway is also called a GW virtual machine 3.

Specific Example of Processing in GW Virtual Machine

Figure 3:
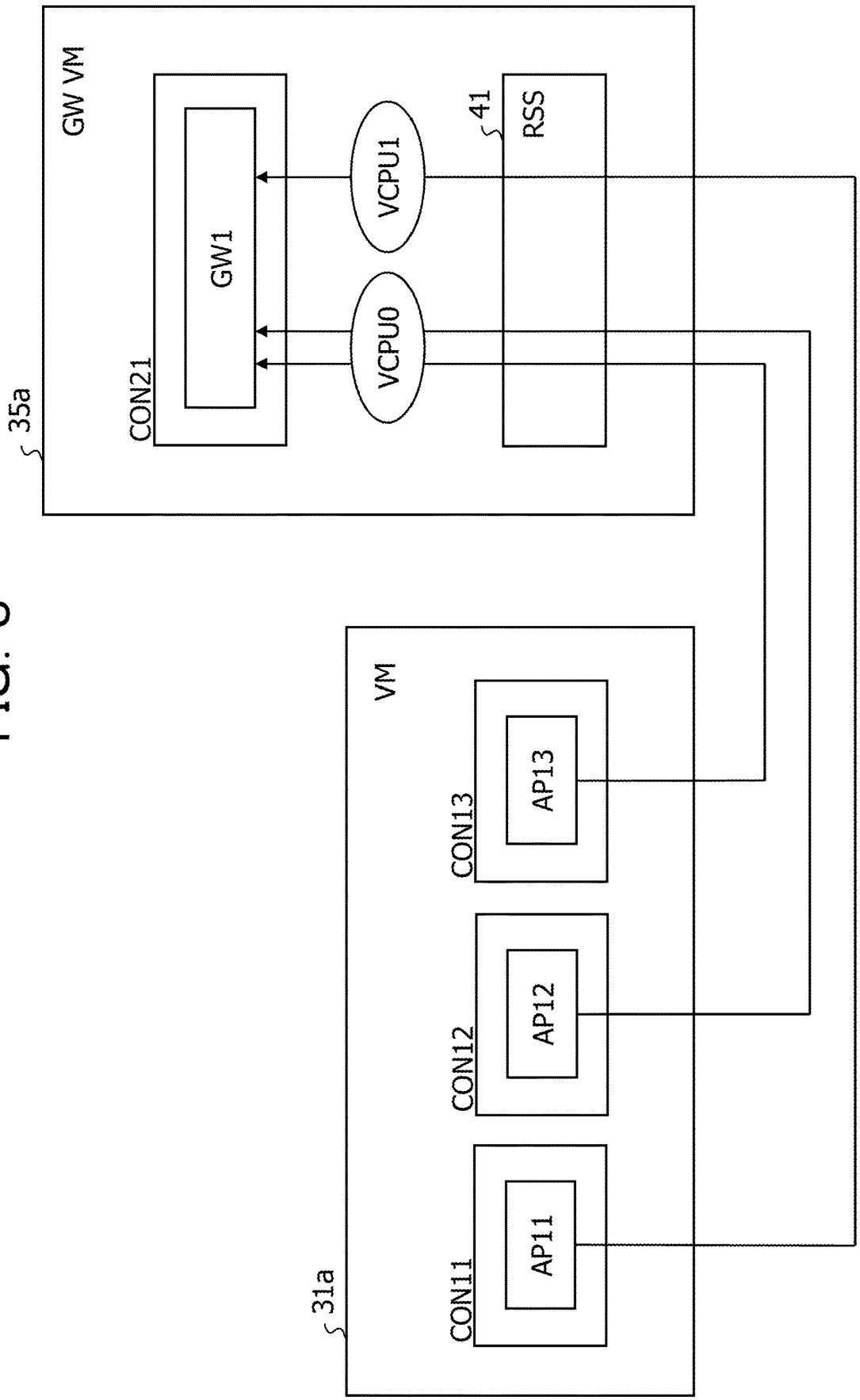
FIG. 3 is a diagram illustrating a specific example of processing in a GW virtual machine.

A specific example of processing in the GW virtual machine 35a will now be described. FIG. 3 is a diagram illustrating a specific example of processing in the GW virtual machine 35a. Description will be given hereinafter assuming that containers CON11, CON12, and CON13, in which AP11, AP12, and AP13 are respectively running, are created in the virtual machine 31a. Description will also be given assuming that VCPU0 and VCPU1 are assigned to the GW virtual machine 35a from the physical machine 2b.

In the example illustrated in FIG. 3, an RSS 41 is running on the GW virtual machine 35a. The RSS 41 distributes packets transmitted from AP11, AP12, and AP13 to VCPU0 and VCPU1 in accordance with hash values calculated from the IP addresses (transmission source IP addresses) and the like of AP11, AP12, and AP13. For example, in the example illustrated in FIG. 3, the RSS 41 distributes packets such that packets transmitted from AP11 and packets transmitted from AP12 are assigned to VCPU0 and packets transmitted from AP13 are assigned to VCPU1.

This may enable the GW virtual machine 35a to cause VCPUs to perform processes corresponding to packets transmitted from APs in such a manner that the processes are distributed among the VCPUs.

However, in some cases, the packets transmitted from APs are unevenly distributed among VCPUs according to the transmission source IP address and the like of each packet. Therefore, in the GW virtual machine 35a, in this case, a processing delay and the like occur in a VCPU to which many packets are distributed, and therefore processes corresponding to packets transmitted from each AP are unable to be efficiently performed.

To address this, the cloud provider changes the hash value calculated from each packet by intentionally changing the IP address and the like of each AP (the transmission source IP address and the like of the packet), thereby changing the VCPU that performs a process corresponding to the packet.

However, to change the IP address and the like of each packet, for example, making a modification or the like to an application (for example, AP11, AP12, or AP13) produced by a cloud user (tenant) becomes required. Therefore, in some cases, the cloud provider is unable to easily change a VCPU to which packets are distributed.

Thus, for each of a plurality of applications that run on the plurality of virtual machines 3, the management apparatus 1 in the present embodiment acquires, at a predetermined interval, application information including an amount of traffic of packets that the application transmits to any of a plurality of VCPUs.

Then, for each of the plurality of applications, the management apparatus 1 identifies a VCPU to which packets are transmitted from the application, among the plurality of VCPUs, in accordance with a hash vale calculated from information including the transmission source IP address and the transmission destination IP address of packets (hereinafter also called address information) transmitted from the application. Furthermore, for each of the plurality of VCPUs, the management apparatus 1 calculates the amount of traffic of packets that are received by the VCPU by summing the amounts of traffic corresponding to, among the plurality of applications, one or more applications that transmit packets to the VCPU.

Thereafter, the management apparatus 1 identifies, out of the plurality of VCPUs, a VCPU with the calculated amount of traffic exceeding a predetermined threshold (hereinafter also called a specific VCPU) and identifies, among the plurality of applications, an application that changes a VCPU to which the application transmits packets (hereinafter also called a specific application), out of one or more applications that transmit packets to the specific VCPU.

The management apparatus 1 then identifies, among the plurality of virtual machines 3, the virtual machine 3 with which a VCPU to which the specific application transmits packets is changed when the specific application is moved (hereinafter, this virtual machine 3 is also called a specific virtual machine 3), and the management apparatus 1 moves the specific application to the identified virtual machine 3.

For example, instead of making a modification or the like to an application that runs on the virtual machine 3, the management apparatus 1 moves (migrates) the application between virtual machines 3, thereby changing the hash value for each packet transmitted from the application.

Thereby, without making a modification or the like to an application that runs on the virtual machine 3, the management apparatus 1 may change the hash value for each packet transmitted from the application and may appropriately distribute packets to the plurality of VCPUs.

Hardware Configuration of Information Processing System

Figure 4:
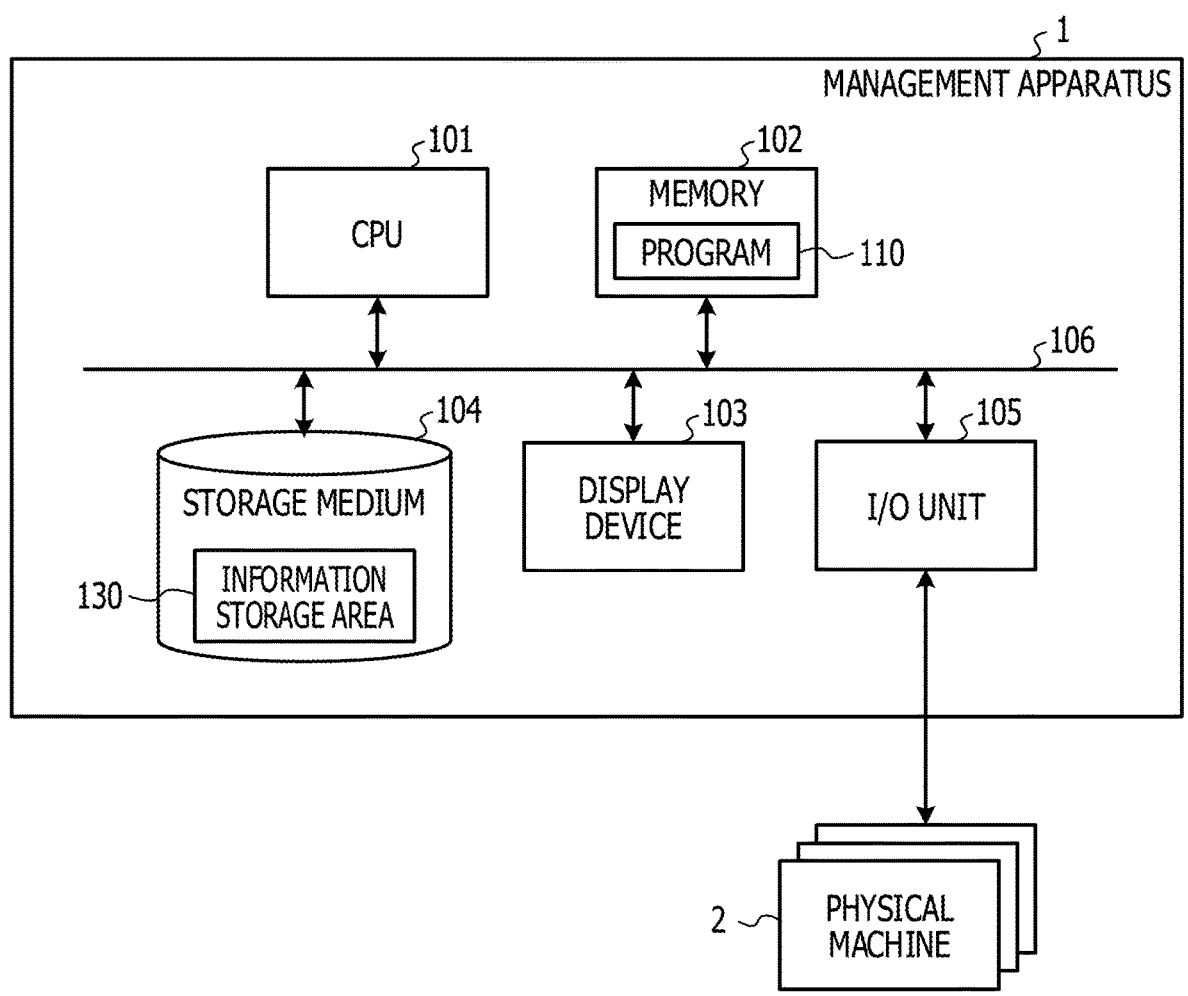
FIG. 4 is a diagram illustrating a hardware configuration of a management apparatus.

The hardware configuration of the information processing system 10 will now be described. FIG. 4 is a diagram illustrating a hardware configuration of the management apparatus 1.

The management apparatus 1, as illustrated in FIG. 4, includes a CPU 101, which is a processor, a memory 102, an external interface (hereinafter also called an I/O unit) 103, a storage medium 104, and a display device 105 that displays various types of information. These components are coupled to each other via a bus 106.

The storage medium 104 has stored, in a program storage area (not illustrated) in the storage medium 104, a program 110 for executing a process for distributing processes corresponding to packets (hereinafter also called a process for process distribution). The storage medium 104 may be, for example, an HDD.

The storage medium 104 includes, for example, an information storage area 130 (hereinafter also called a storage unit 130) in which information used in performing the process for process distribution is stored.

The CPU 101 executes the program 110 loaded into the memory 102 from the storage medium 104 to perform the process for process distribution.

The external interface 103, for example, performs communication with the physical machine 2.

Functions of Information Processing System

Figure 5:
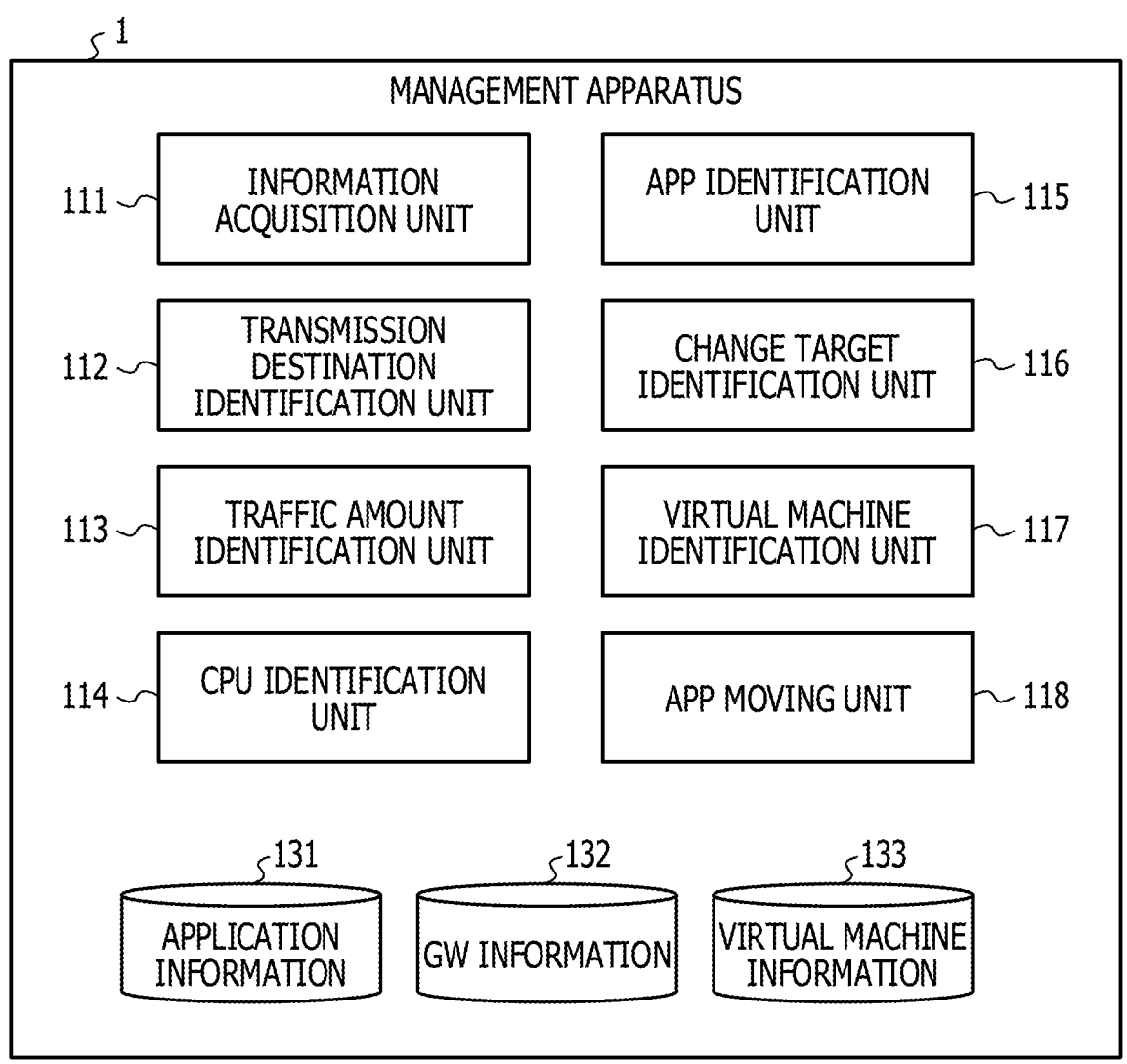
FIG. 5 is a block diagram of functions of a management apparatus.

The functions of the information processing system 10 will now be described. FIG. 5 is a block diagram of functions of the management apparatus 1.

In the management apparatus 1, hardware, such as the CPU 101 and the memory 102, and the program 110 cooperate systematically, so that, as illustrated in FIG. 5, various functions including an information acquisition unit 111, a transmission destination identification unit 112, a traffic amount identification unit 113, a CPU identification unit 114, an app identification unit 115, a change target identification unit 116, a virtual machine identification unit 117, and an app moving unit 118 are achieved.

In the information storage area 130 described with reference to FIG. 4, for example, application information 131, GW information 132, and virtual machine information 133 are stored.

For each of the plurality of applications that run on the plurality of virtual machines 3, the information acquisition unit 111 acquires, at a predetermined interval, the application information 131 including the amount of traffic of packets that the application transmits to any of a plurality of VCPUs. The information acquisition unit 111 then stores the acquired application information 131 in the information storage area 130. A specific example of the application information 131 will be described hereinafter.

For each of the plurality of applications, the transmission destination identification unit 112 identifies, among the plurality of VCPUs, a VCPU to which packets are transmitted from each application, in accordance with a hash value calculated from address information including the transmission source IP address and the transmission destination IP address of packets transmitted from the application. The address information may include, in addition to the transmission source IP address and the transmission destination IP address of packets transmitted from each application, the transmission source port number and the transmission destination port number of the packets transmitted from the application.

The traffic amount identification unit 113 references the application information 131 stored in the information storage area 130 and, for each of the plurality of VCPUs, calculates the amount of traffic of packets that are received by the VCPU by summing the amounts of traffic corresponding to, among the plurality of applications, one or more applications that transmit packets to the VCPU.

The CPU identification unit 114 identifies, out of the plurality of VCPUs, a specific VCPU whose amount of traffic calculated by the traffic amount identification unit 113 exceeds the given threshold.

The app identification unit 115 identifies, among the plurality of applications, a specific application that changes a VCPU to which the specific application transmits packets, out of one or more applications that transmit packets to the specific VCPU identified by the CPU identification unit 114.

The change target identification unit 116 identifies, among the plurality of VCPUs, a VCPU serving as a change target (hereinafter also called another VCPU) to which the specific application identified by the app identification unit 115 transmits packets.

The virtual machine identification unit 117 identifies, among the plurality of virtual machines 3, a specific virtual machine 3 with which the VCPU to which the specific application transmits packets is changed to another VCPU when the specific application identified by the app identification unit 115 is moved.

The app moving unit 118 moves the specific application specified by the app identification unit 115 to the virtual machine 3 identified by the virtual machine identification unit 117.

The app moving unit 118 may be a function that a physical machine (for example, a physical machine that manages Cloud Foundry) different from the management apparatus 1 has. The GW information 132 and the virtual machine information 133 will be described hereinafter.

Outline of First Embodiment

Figure 6:
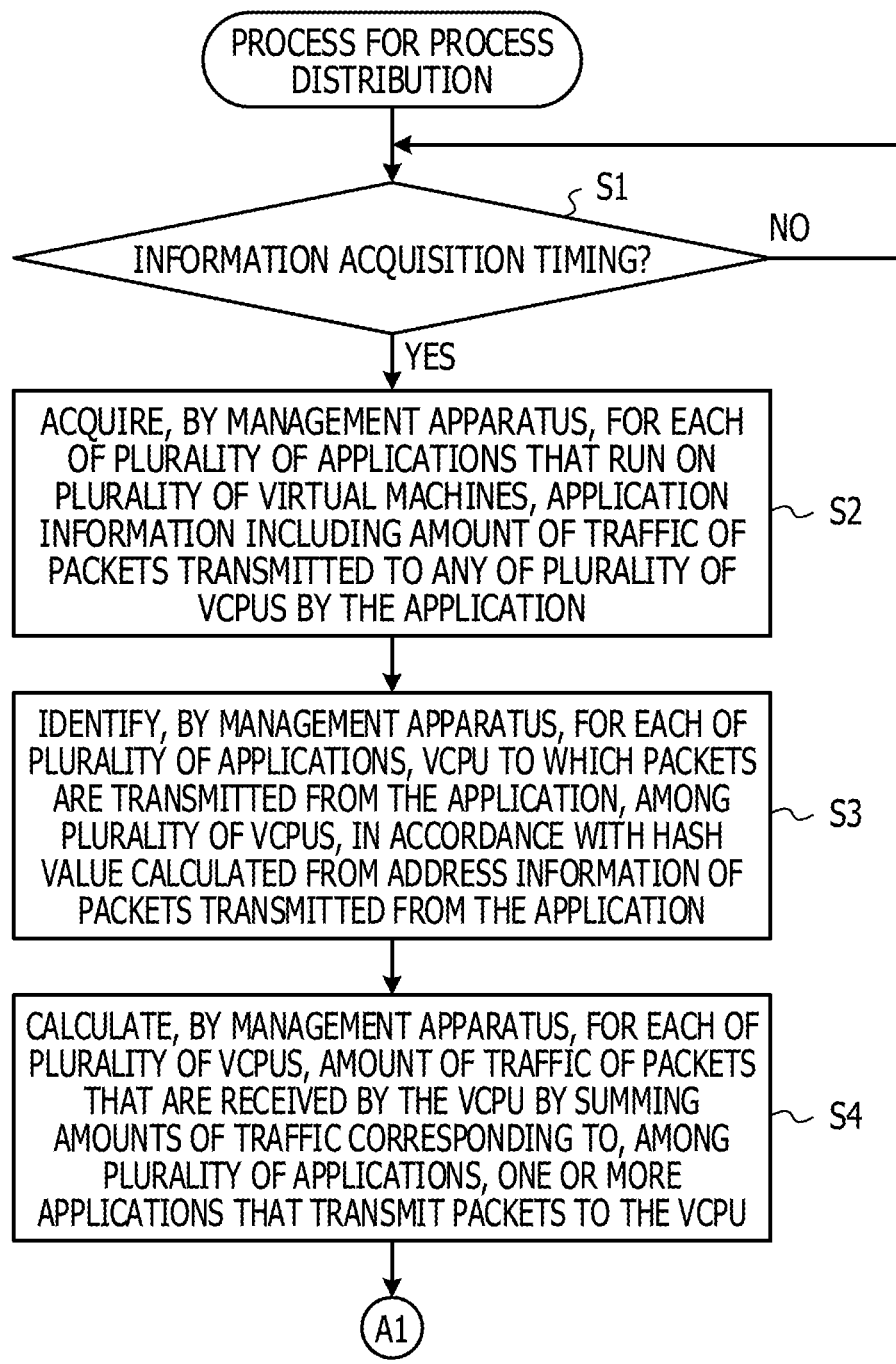
FIG. 6 is a flowchart diagram illustrating an outline of a process for process distribution in a first embodiment.
Figure 7:
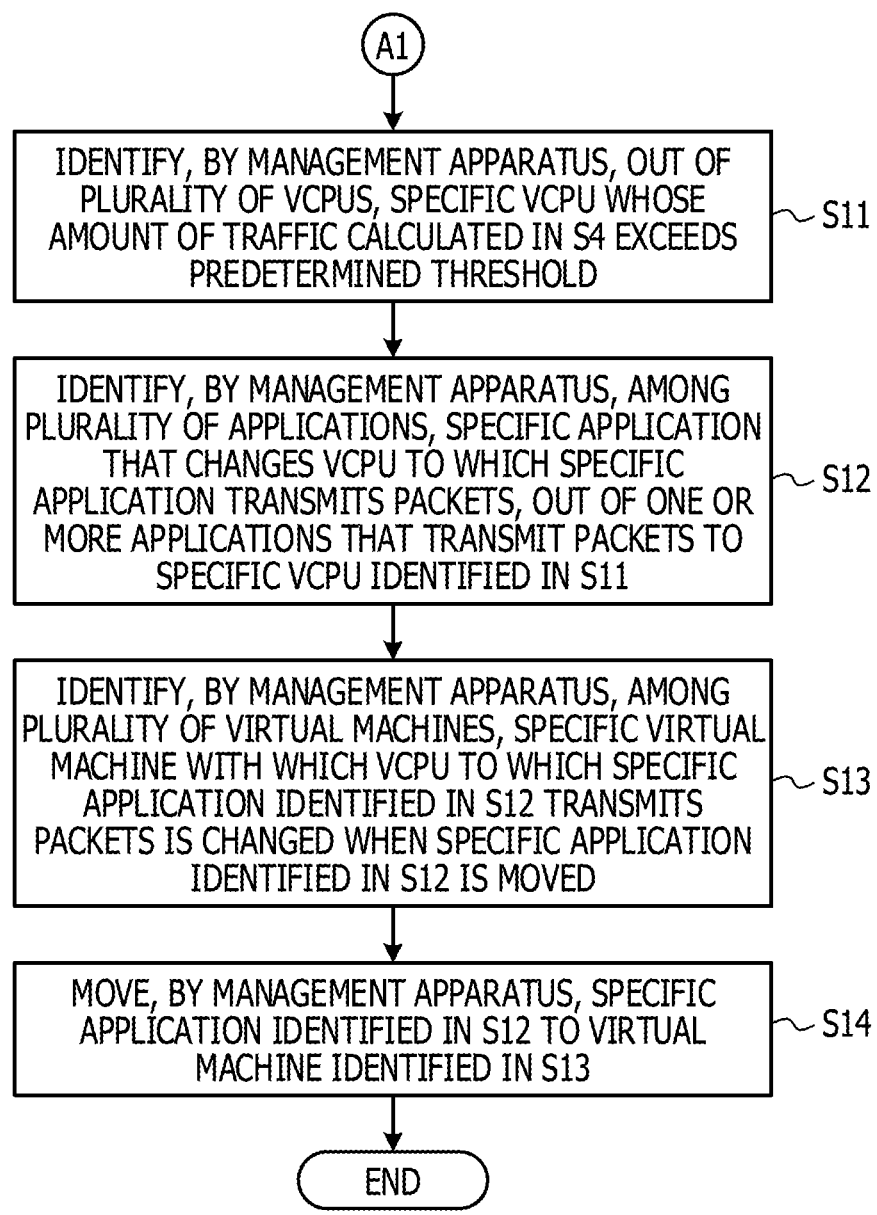
FIG. 7 is a flowchart diagram illustrating an outline of a process for process distribution in a first embodiment.

The outline of the first embodiment will now be described. FIG. 6 and FIG. 7 are flowchart diagrams illustrating the outline of a process for process distribution in the first embodiment. FIG. 8 to FIG. 11 are diagrams illustrating the outline of the process for process distribution in the first embodiment. With Reference to FIG. 8 to FIG. 11, the process for process distribution illustrated in FIG. 6 and FIG. 7 will be described.

As illustrated in FIG. 6, the management apparatus 1 waits until an information acquisition timing is reached (NO in S1). The information acquisition timing may be, for example, a regular timing, such as a 1-minute interval.

If the information acquisition timing is reached (YES in S1), the management apparatus 1 acquires, for each of a plurality of applications that run on the plurality of virtual machines 3, the application information 131 including the amount of traffic of packets that the application transmits to any of a plurality of VCPUs (a plurality of VCPUs assigned to the GW virtual machine 3 by the physical machine 2) (S2).

Subsequently, for each of the plurality of applications, the management apparatus 1 identifies a VCPU to which packets are transmitted from the application, among the plurality of VCPUs, in accordance with a hash value calculated from the address information of packets transmitted from the application (S3). A specific example of the process of S3 will be described hereinafter.

Specific Example of Process of S3

FIG. 8 is a diagram illustrating a specific example of the process of S3. In detail, FIG. 8 is a diagram illustrating a specific example of a packet that is transmitted from an application to a VCPU.

In a packet that is transmitted from an application to a VCPU, for example, preceding a data portion (hereinafter also called data), a header portion is added. The header portion contains a transmission destination IP address (hereinafter also called DA-IP), a transmission source IP address (hereinafter also called SA-IP), a transmission destination port number (hereinafter also called DA-Port), and a transmission source port number (hereinafter also called SA-Port).

For example, the header portion included in the packet illustrated in FIG. 8, "10.0.1.1", "10.0.0.1", "50", and "1000" are set as the transmission destination IP address, the transmission source IP address, the transmission destination port number, and the transmission source port number, respectively.

In the process of S3, the management apparatus 1 calculates a hash value corresponding to the packet illustrated in FIG. 8, for example, by using "10.0.1.1", "10.0.0.1", "50", and "1000". Then, the management apparatus 1, for example, references association information (not illustrated) in which hash values are associated with VCPUs, and identifies a VCPU associated with the calculated hash value.

With reference now to FIG. 6, for each of the plurality of VCPUs, the management apparatus 1 calculates the amount of traffic of packets that are received by the VCPU by summing the amounts of traffic corresponding to, among the plurality of applications, one or more applications that transmit packets to the VCPU (S4). A specific example of the process of S4 will be described hereinafter.

Specific Example of Process of S4

Figure 9:
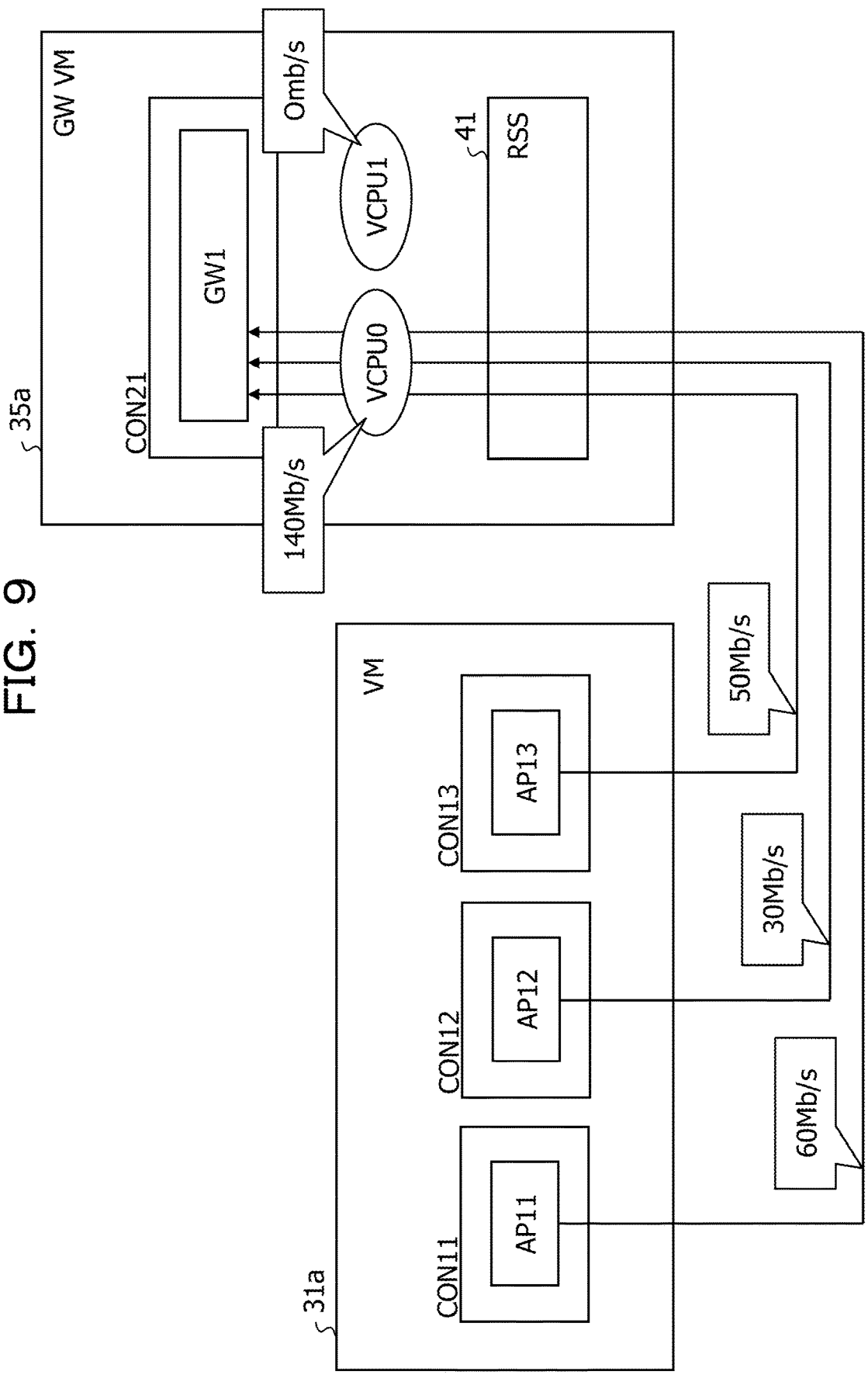
FIG. 9 is a diagram illustrating an outline of a process for process distribution in a first embodiment.

FIG. 9 is a diagram illustrating a specific example of the process of S4.

AP11, AP12, and AP13 in the example illustrated in FIG. 9 transmit packets of amounts of traffic of 60 Mb/s, 30 Mb/s, and 50 Mb/s, respectively, to the GW virtual machine 35a. The RSS 41 in the example illustrated in FIG. 9 distributes all the processes corresponding to the packets respectively transmitted from AP11, AP12, and AP13 to VCPU0.

Therefore, in the process of S4, the management apparatus 1 determines 140 Mb/s, by calculation, as the amount of traffic of packets that are received by VCPU0 and determines 0 Mb/s, by calculation, as the amount of traffic of packets that are received by VCPU1.

With reference now to FIG. 7, the management apparatus 1 identifies, out of the plurality of VCPUs, a specific VCPU whose amount of traffic calculated in the process of S4 exceeds the predetermined threshold (S11).

Specifically, in the example illustrated in FIG. 9, for example, in the case where the predetermined threshold is 100 Mb/s, the management apparatus 1 identifies VCPU0 as a VCPU whose amount of traffic of packets exceeds the predetermined threshold.

The management apparatus 1 then identifies, among the plurality of applications, a specific application that changes a VCPU to which the specific application transmits packets, out of one or more applications that transmit packets to the specific VCPU identified in the process of S11(S12).

Specifically, in the example illustrated in FIG. 9, for example, the management apparatus 1 identifies, among AP11, AP12, and AP13 that transmit packets to VCPU0, AP11 whose amount of traffic of packets to VCPU0 is greatest.

Subsequently, the management apparatus 1 identifies, among the plurality of virtual machines 3, a specific virtual machine 3 with which the VCPU to which the specific application identified in the process of S12 transmits packets is changed when the specific application identified in the process of S12 is moved (S13).

For example, when the virtual machine 3 on which AP11 runs is changed, there is a possibility that the transmission source IP address of packets that are transmitted from AP11 will be changed, the hash value for packets that are transmitted from AP11 will be changed, and the VCPU serving as the transmission destination of packets that are transmitted from AP11 will be changed. Therefore, in the process of S13, the management apparatus 1 performs identification of the virtual machine 3 with which the VCPU to which AP11 transmits packets is changed when the virtual machine 3 on which AP11 runs is changed. A specific example of the process of S13 will be described hereinafter.

Specific Example of Process of S13

Figure 10:
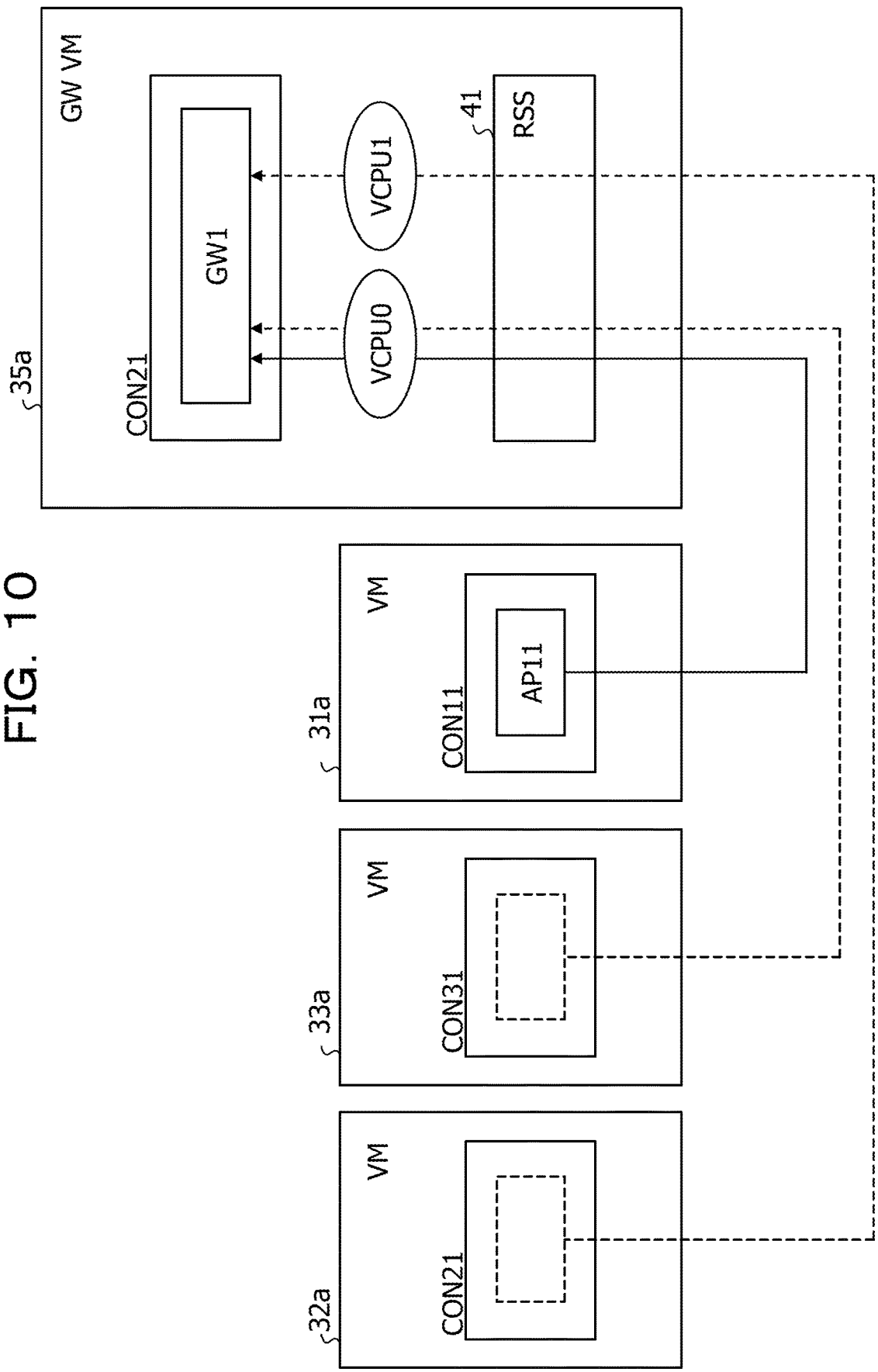
FIG. 10 is a diagram illustrating an outline of a process for process distribution in a first embodiment.

FIG. 10 is a diagram illustrating a specific example of the process of S13. Description will be given hereinafter assuming that a VM 32a and a VM 33a are created in the physical machine 2a described with reference to FIG. 2. Description will also be given hereinafter assuming that a container CON21 is created in the VM32a and a container CON31 is created in the VM33a.

For example, as indicated by a dotted line in FIG. 10, when AP11 that transmits packets to VCPU0 is moved to the VM 32a (the container CON21), the management apparatus 1 identifies VCPU1 as a VCPU to which packets will be transmitted from AP11. For example, as indicated by a dotted line in FIG. 10, when AP11 that transmits packets to VCPU0 is moved to the VM 33a (the container CON31), the management apparatus 1 identifies VCPU0 as a VCPU to which packets will be transmitted from AP11.

For example, in this case, the management apparatus 1 determines that it is possible to change a VCPU to which packets are transmitted from AP11, from VCPU0 to VCPU1, by moving AP11 to the VM 32a.

With reference now to FIG. 7, the management apparatus 1 moves the specific application identified in the process of S12 to the virtual machine 3 identified in the process of S13 (S14).

Figure 11:
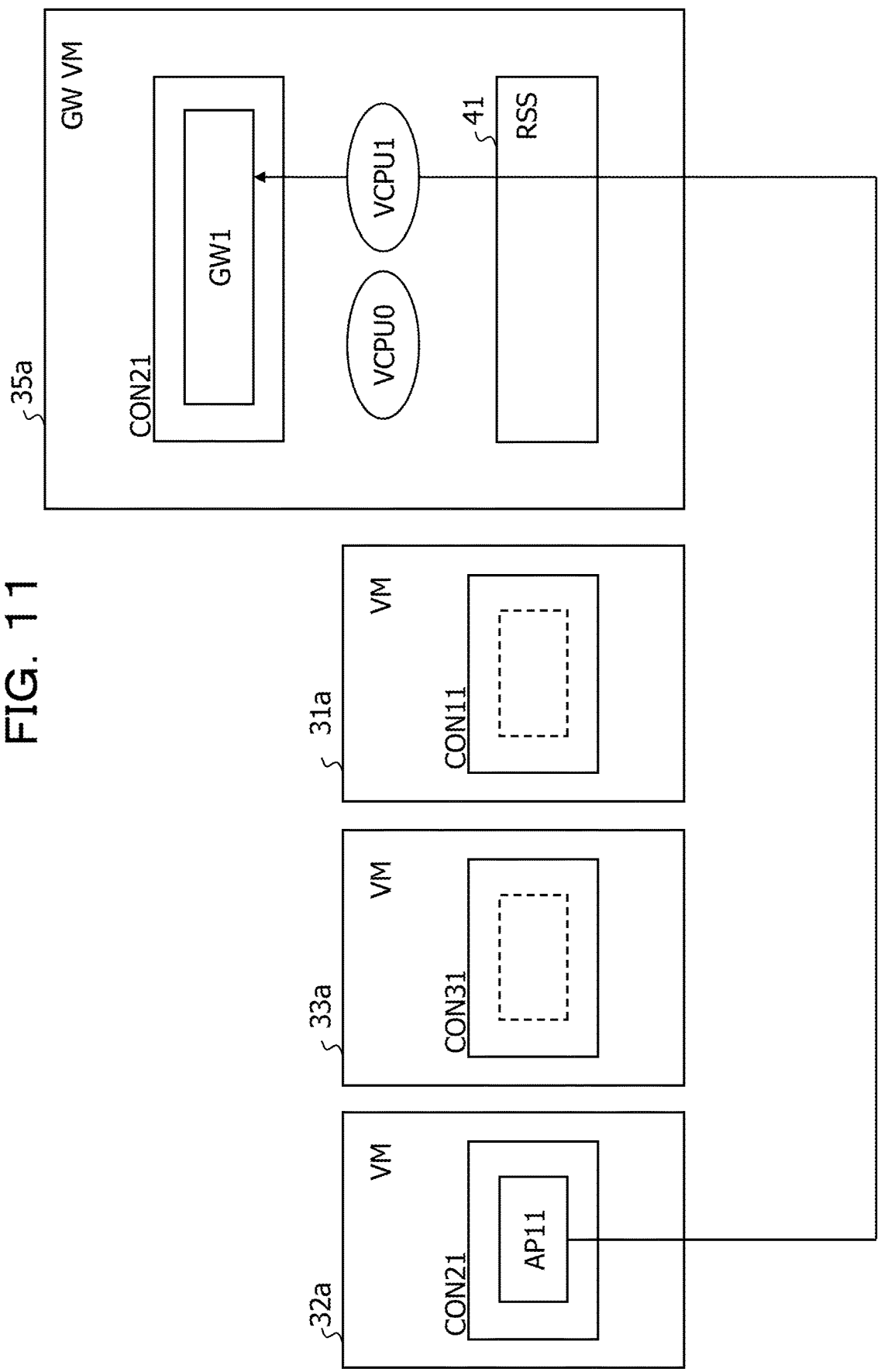
FIG. 11 is a diagram illustrating an outline of a process for process distribution in a first embodiment.

For example, as illustrated in FIG. 11, the management apparatus 1 moves AP11 that has run on the VM 31a to the VM 32a identified in the process of S13.

Thus, without making a modification or the like to an application that runs on the virtual machine 3, the management apparatus 1 may change the hash value for each packet transmitted from the application and may appropriately distribute packets to a plurality of VCPUs.

Details of First Embodiment

Details of the first embodiment will now be described. FIG. 12 to FIG. 19 are flowchart diagrams illustrating details of the process for process distribution in the first embodiment. FIG. 20 to FIG. 25 are diagrams illustrating details of the process for process distribution in the first embodiment. With reference to FIG. 20 to FIG. 25, details of the process for process distribution illustrated in FIG. 12 to FIG. 19 will be described.

Information Acquisition Process

Figure 12:
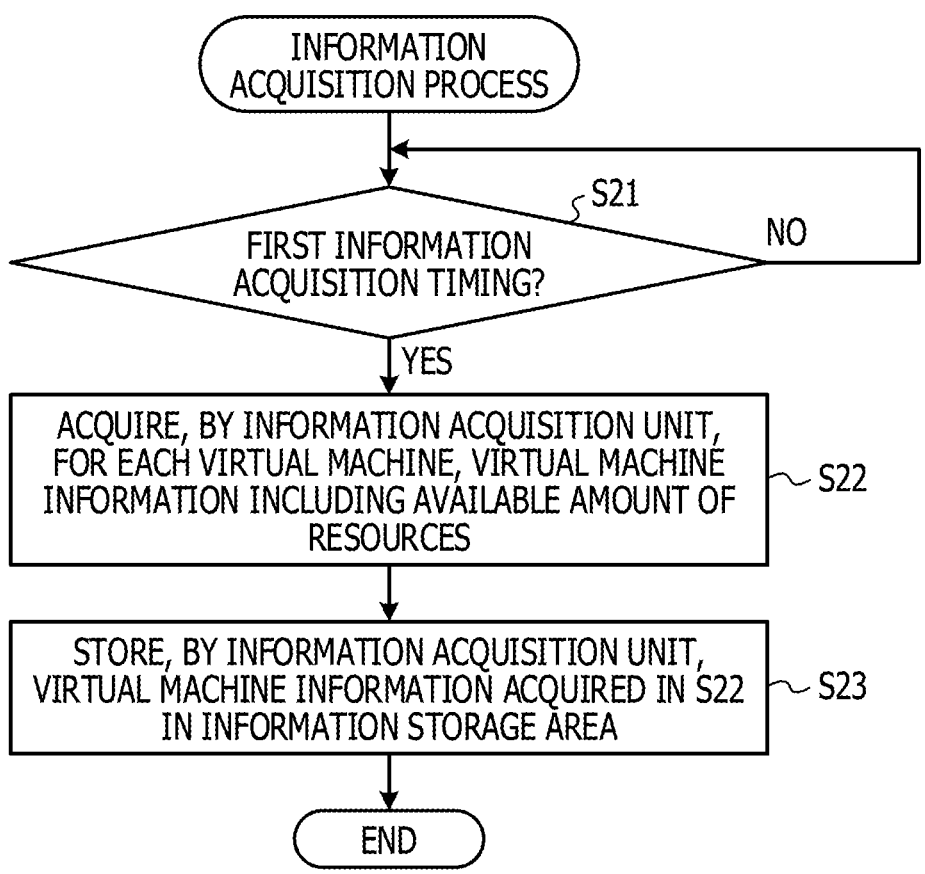
FIG. 12 is a flowchart diagram illustrating details of a process for process distribution in a first embodiment.

Initially, in the process for process distribution, a process of acquiring the virtual machine information 133 (hereinafter also called an information acquisition process) will be described. FIG. 12 is a flowchart diagram illustrating the information acquisition process.

As illustrated in FIG. 12, the information acquisition unit 111 of the management apparatus 1 waits until a first information acquisition timing is reached (NO in S21). The first information acquisition timing may be, for example, a regular timing, such as a 1-minute interval.

If the first information acquisition timing is reached (YES in S21), the information acquisition unit 111 acquires, for each virtual machine 3, the virtual machine information 133 including an available amount of resources (S22). The information acquisition unit 111 then stores the virtual machine information 133 acquired in the process of S22 in the information storage area 130 (S23). Specific examples of the virtual machine information 133 will be described hereinafter.

Specific Examples of Virtual Machine Information

FIG. 20 and FIG. 24 are diagrams illustrating specific examples of the virtual machine information 133.

The virtual machine information 133 illustrated in FIG. 20 or the like includes, as items, "item number" that identifies each information included in the virtual machine information 133 and "VM ID" that identifies the virtual machine 3. The virtual machine information 133 illustrated in FIG. 20 or the like also includes, as items, "VCPU available amount" indicating the amount (number) of available VCPUs and "memory available amount" indicating the amount of available memory.

For example, in the virtual machine information 133 illustrated in FIG. 20, for information with "item number" of "1", "VM 31a" is set as "VM ID", "2 (pcs)" is set as "VCPU available amount", and "3 (Mb)" is set as "memory available amount".

In the virtual machine information 133 illustrated in FIG. 20, for information with "item number" of "2", "VM 32a" is set as "VM ID", "3 (pcs)" is set as "VCPU available amount", and "4 (Mb)" is set as "memory available amount". Other information included in FIG. 20 is omitted in the description.

Details of Process for Process Distribution

Details of the process for process distribution will now be described. FIG. 13 to FIG. 19 are flowchart diagrams illustrating details of the process for process distribution.

Figure 13:
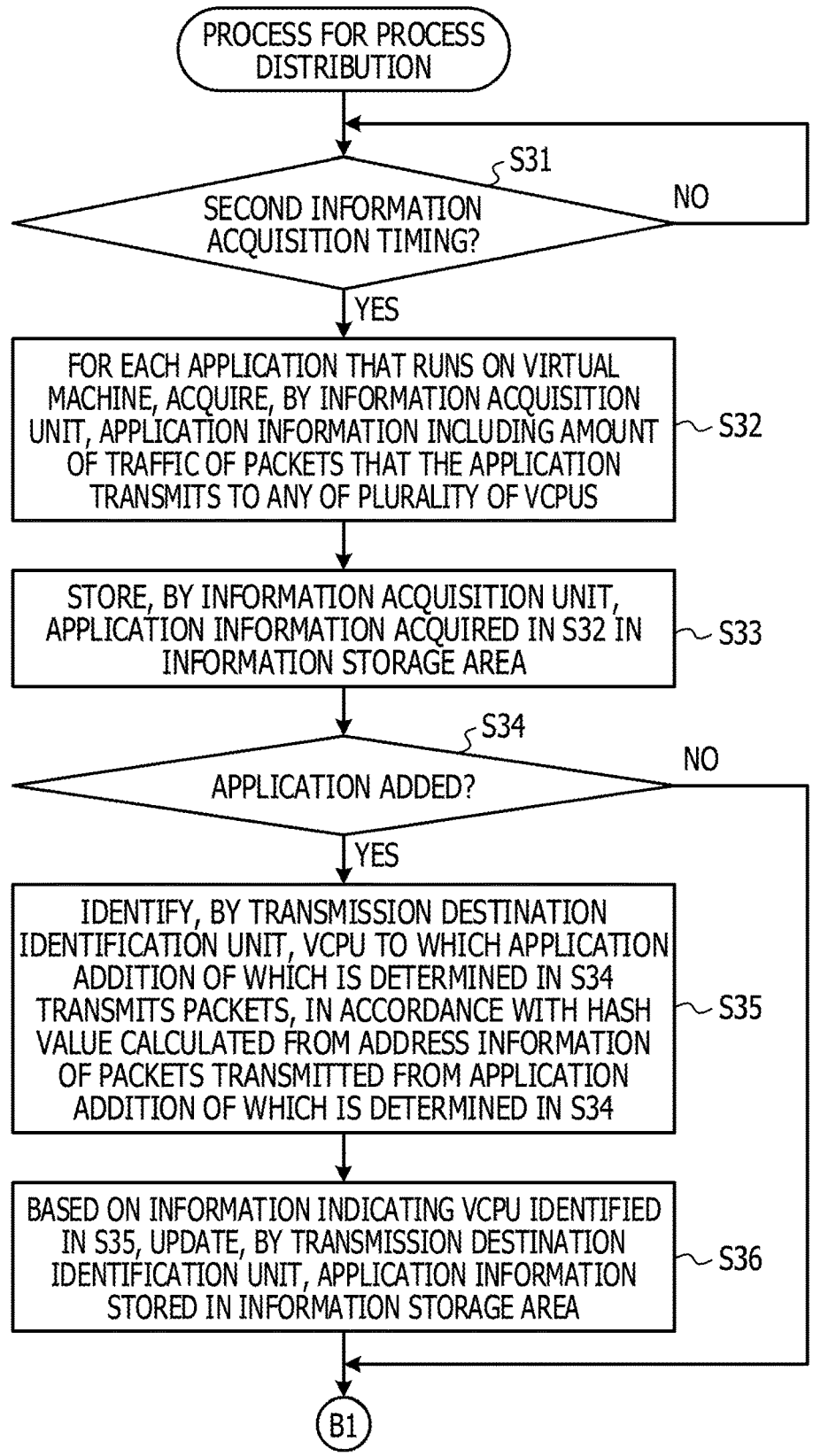
FIG. 13 is a flowchart diagram illustrating details of a process for process distribution in a first embodiment.

As illustrated in FIG. 13, the information acquisition unit 111 waits until a second information acquisition timing is reached (NO in S31). The second information acquisition timing may be, for example, a regular timing, such as a 1-minute interval. The second information acquisition timing may also be the same timing as the first information acquisition timing.

If the second information acquisition timing is reached (YES in S31), the information acquisition unit 111 acquires, for each application that runs on the virtual machine 3, the application information 131 including the amount of traffic of packets that the application transmits to any of the plurality of VCPUs (S32). Then, the information acquisition unit 111 stores the application information 131 acquired in the process of S32 in the information storage area 130 (S33). Specific examples of the application information 131 will be described hereinafter.

Specific Examples of Application Information

FIG. 21 and FIG. 25 are diagrams illustrating specific examples of the application information 131.

The application information 131 illustrated in FIG. 21 or the like includes, as items, "item number" that identifies each information included in the application information 131, "VCPU ID" that identifies a VCPU, "app ID" that identifies an application, and "traffic amount" for which the amount of traffic of packets that are transmitted from an application to a VCPU is set. The application information 131 illustrated in FIG. 21 or the like also includes, as items, "VCPU usage amount" indicating the amount (number) of VCPUs required for running an application, "memory usage amount" indicating the amount of memory required for running an application, "VM ID" that identifies the virtual machine 3 on which an application is running.

For example, in the application information 131 illustrated in FIG. 21, for information with "item number" of "1", "VCPU0" is set as "VCPU ID", "AP11" is set as "app ID", and "60 (Mb/s)" is set as "traffic amount". In the application information 131 illustrated in FIG. 21, for the information with "item number" of "1", "1 (pcs)" is set as "VCPU usage amount", "0.5 (Mb)" is set as "memory usage amount", and "VM 31$a$" is set as "VM ID".

In the application information 131 illustrated in FIG. 21, for information with "item number" of "2", "VCPU0" is set as "VCPU ID", "AP12" is set as "app ID", and "30 (Mb/s)" is set as "traffic amount". In the application information 131 illustrated in FIG. 21, for the information with "item number" of "2", "1 (pcs)" is set as "VCPU usage amount", "0.5 (Mb)" is set as "memory usage amount", and "VM 31$a$" is set as "VM ID". Other information included in FIG. 21 is omitted in the description.

With reference now to FIG. 13, the transmission destination identification unit 112 of the management apparatus 1 determines whether an application that runs on the virtual machine 3 is added (S34). For example, the transmission destination identification unit 112 determines whether new information (information on a new application) is added to the application information 131 acquired in the process of S32.

As a result, if it is determined that a new application is added (YES in S34), the transmission destination identification unit 112 identifies a VCPU to which the application addition of which is determined in the process of S34 transmits packets, in accordance with a hash value calculated from address information of packets transmitted from the application addition of which is determined in the process of S34 (S35).

Based on information indicating the VCPU identified in the process of S35, the transmission destination identification unit 112 updates the application information 131 stored in the information storage area 130 (S36).

For example, there are some cases in which, for example, information that identifies a VCPU in which a process corresponding to packets transmitted from a new application is performed (information that is set for "VCPU ID" in the application information 131 illustrated in FIG. 20) is not included in information acquired in the process of S32. Therefore, for example, in the process of S35, the transmission destination identification unit 112 calculates a hash value from the transmission source IP address and the like (address information) of packets transmitted from the new application. Then, the transmission destination identification unit 112 references the association information (not illustrated) and identifies a VCPU associated with the calculated hash value. Thereafter, in the process of S36, the transmission destination identification unit 112 sets information corresponding to the identified VCPU for "VCPU ID" corresponding to the new application among the application information 131 stored in the process of S33 in the information storage area 130.

However, if, in the process of S34, it is determined that a new application is not added (NO in S34), the transmission destination identification unit 112 does not perform the process of S35 and S36.

Figure 14:
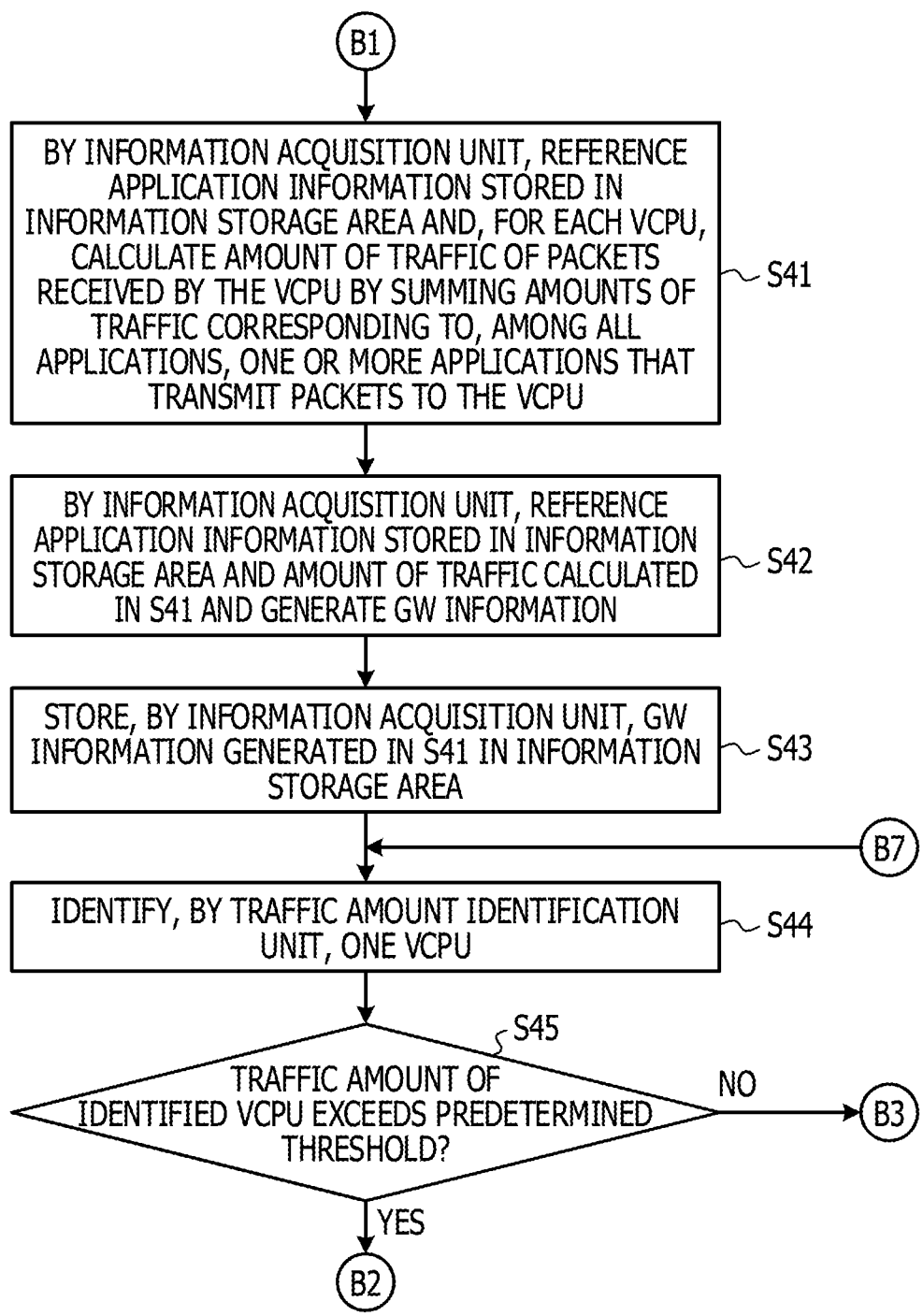
FIG. 14 is a flowchart diagram illustrating details of a process for process distribution in a first embodiment.

As illustrated in FIG. 14, the information acquisition unit 111 then references the application information 131 stored in the information storage area 130 and, for each VCPU, calculating the amount of traffic of packets that are received by the VCPU by summing the amounts of traffic corresponding to, among all the applications, one or more applications that transmit packets to the VCPU (S41).

For example, in the application information 131 described with reference to FIG. 21, "60 (Mb/s)", "30 (Mb/s)", and "50 (Mb/s)" are set for "traffic amount" of the information in which "VCPU0" is set for "VCPU ID" (information with "item number" of "1" to "3"), respectively. Therefore, the information acquisition unit 111 determines 140 Mb/s, by calculation, as the amount of traffic of packets that are received by VCPU0.

In contrast, in the application information 131 described with reference to FIG. 21, there is no information in which "VCPU1" is set for "VCPU ID". Therefore, the information acquisition unit 111 determines 0 Mb/s, by calculation, as the amount of traffic of packets that are received by VCPU1.

Furthermore, the information acquisition unit 111 references the application information 131 stored in the information storage area 130 and the amount of traffic calculated in the process of S41 and generates the GW information 132 (S42). Then, the information acquisition unit 111 stores the generated GW information 132 in the information storage area 130 (S43). Specific examples of the GW information 132 will be described hereinafter.

Specific Examples of GW Information

FIG. 22 and FIG. 23 are diagrams illustrating specific examples of the GW information 132.

The GW information 132 illustrated in FIG. 22 or the like includes, as items, "item number" that identifies each information included in the GW information 132, "VCPU ID" that identifies a VCPU, "traffic amount" for which the sum of amounts of traffic of packets that are transmitted from applications to a VCPU is set, and "threshold" for which a predetermined threshold determined in advance for each VCPU is set. Description will be given hereinafter assuming that 100 Mb/s is set in advance as predetermined thresholds of VCPU0 and VCPU1.

For example, in the process of S41, the information acquisition unit 111 determines 140 Mb/s, by calculation, as the amount of traffic of packets that are received by VCPU0. Therefore, as illustrated in FIG. 22, for information with "item number" of "1", the information acquisition unit 111 sets "VCPU0" as "VCPU ID", sets "140 (Mb/s)" as "traffic amount", and sets "100 (Mb/s)" as "threshold".

In the process of S41, the information acquisition unit 111 determines 0 Mb/s, by calculation, as the amount of traffic of packets that are received by VCPU1. Therefore, as illustrated in FIG. 22, for information with "item number" of "2", the information acquisition unit 111 sets "VCPU1" as "VCPU ID", sets "0 (Mb/s)" as "traffic amount", and sets "100 (Mb/s)" as "threshold".

With reference now to FIG. 14, the traffic amount identification unit 113 of the management apparatus 1 identifies one VCPU (S44). For example, the traffic amount identification unit 113 identifies one VCPU that receives packets transmitted from each application.

The traffic amount identification unit 113 determines whether the amount of traffic of the VCPU identified in the process of S44 exceeds the predetermined threshold (S45).

For example, the traffic amount identification unit 113 determines whether an application that runs on the virtual machine 3 has to be moved.

Figure 17:
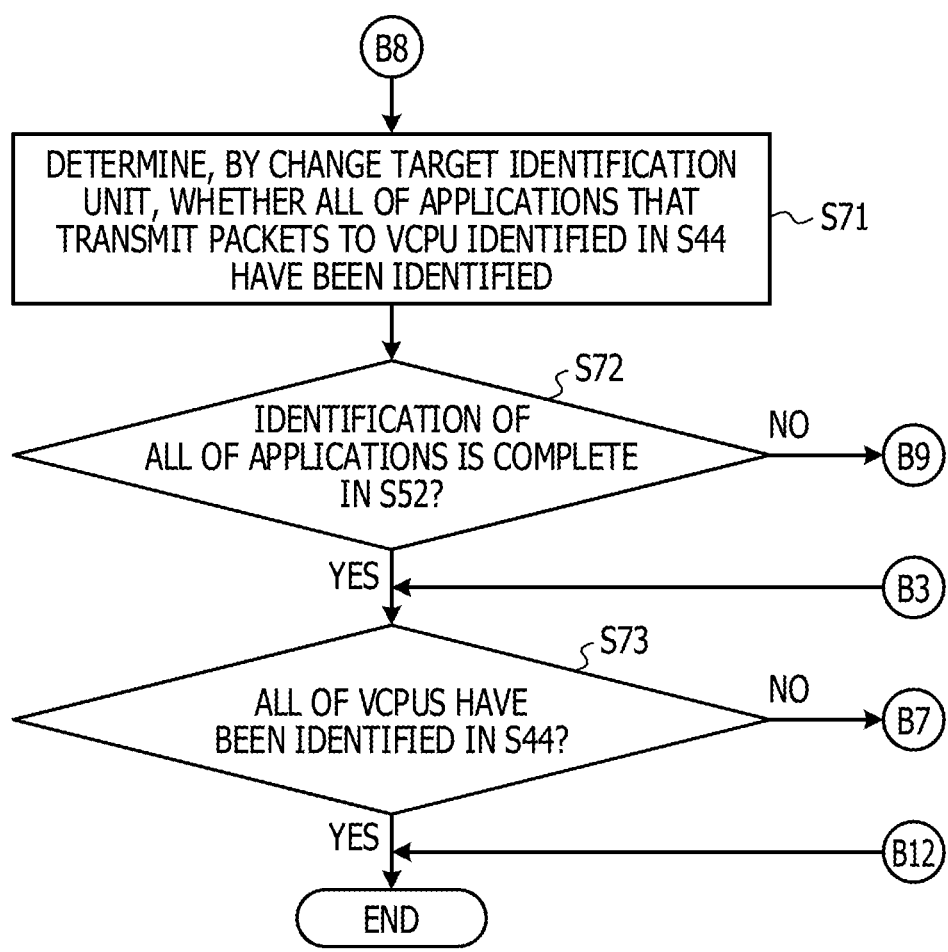
FIG. 17 is a flowchart diagram illustrating details of a process for process distribution in a first embodiment.

As a result, if it is determined that the traffic amount of the VCPU identified in the process of S44 does not exceed the predetermined threshold (NO in S45), the change target identification unit 116 determines, as illustrated in FIG. 17, whether all of the VCPUs have been identified in the process of S44 (S73).

If it is determined that all of the VCPUs have been identified (YES in S73), the management apparatus 1 terminates the process for process distribution.

However, if it is determined that all of the VCPUs have not been identified (NO in S73), the traffic amount identification unit 113 performs again the process of S44 and the subsequent steps.

Figure 15:
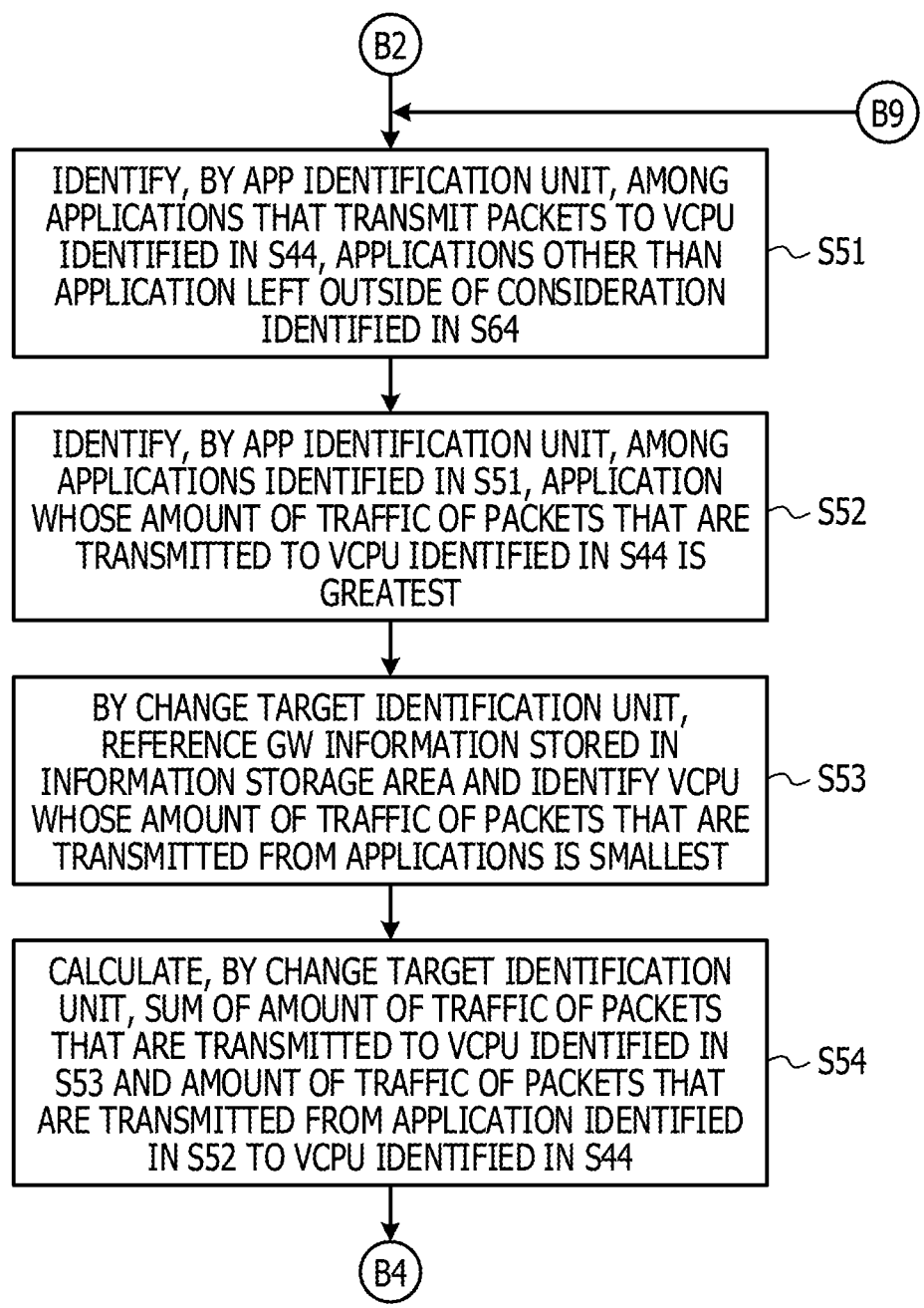
FIG. 15 is a flowchart diagram illustrating details of a process for process distribution in a first embodiment.
Figure 16:
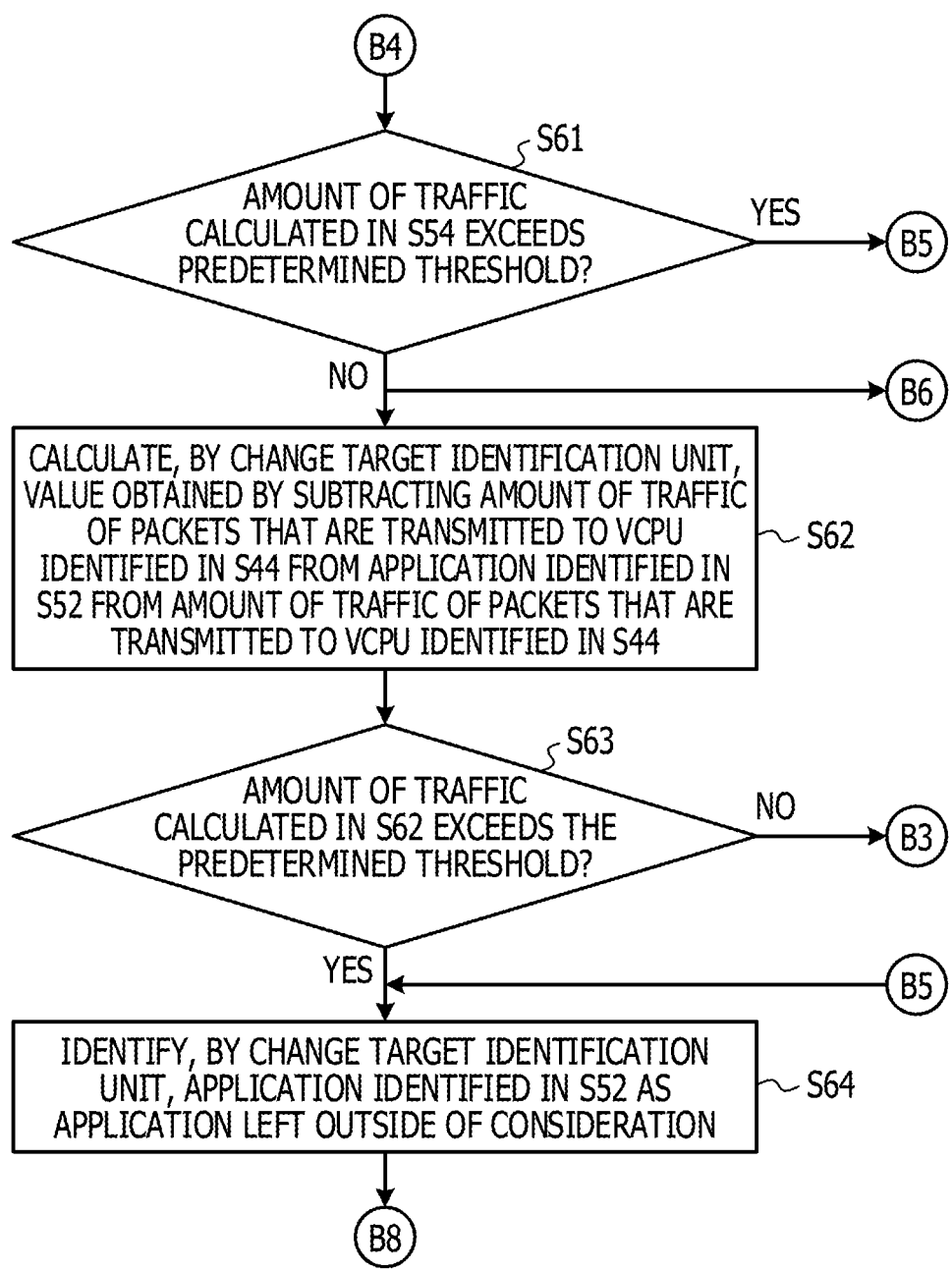
FIG. 16 is a flowchart diagram illustrating details of a process for process distribution in a first embodiment.

If, in the process of S45, it is determined that the amount of traffic of the VCPU identified in the process of S44 exceeds the predetermined threshold (YES in S45), as illustrated in FIG. 15, the app identification unit 115 of the management apparatus 1 identifies, among applications that transmit packets to the VCPU identified in the process of S44, applications other than an application left outside of consideration, which is identified in S64 described hereinafter (S51).

Specifically, for example, in the case where the VCPU specified in the process of S44 is VCPU0, the traffic amount identification unit 113 references the GW information 132 described with reference to FIG. 22 and determines that "140 (Mb/s)", which is the value set for "traffic amount" of information in which "VCPU0" is set for "VCPU ID", is greater than "100 (Mb/s)", which is the value set for "threshold" of this information. Therefore, the app identification unit 115 references the application information 131 described with reference to FIG. 21 and identifies "AP11", "AP12", and "AP13", which are information set for "app ID" of the information in which "VCPU0" is set for "VCPU ID".

The app identification unit 115 then identifies, among the applications identified in the process of S51, an application whose amount of traffic of packets that are transmitted to the VCPU identified in the process of S44 is greatest (S52). For example, the app identification unit 115 identifies an application whose amount of traffic of packets that are transmitted to the VCPU identified in the process of S44 is greatest, as a candidate of an application to be moved to another virtual machine 3.

For example, the app identification unit 115 references the application information 131 described with reference to FIG. 21 and identifies, among information (information with "item number" of "1", "2", and "3") in which the applications identified in the process of S51 are set for "app ID", "AP11" that is information set for "app ID" of the information in which the greatest value is set for "traffic amount".

Subsequently, the change target identification unit 116 of the management apparatus 1 references the GW information 132 stored in the information storage area 130 and identifies a VCPU whose amount of traffic of packets that are transmitted from applications is smallest (S53). For example, the change target identification unit 116 identifies a VCPU whose amount of traffic of packets that are transmitted from applications is smallest, as a change target candidate of a VCPU assigned to receive packets that are transmitted from the application specified in the process of S52.

For example, the change target identification unit 116 references the GW information 132 described with reference to FIG. 22 and identifies "VCPU1" set for "VCPU ID" of the information in which the value set for "traffic amount" is smallest.

The change target identification unit 116 then calculates the sum of the amount of traffic of packets that are transmitted to the VCPU identified in the process of S53 and the amount of traffic of packets that are transmitted from the application identified in the process of S52 to the VCPU identified in the process of S44 (S54).

Specifically, for example, in the case where the VCPU identified in the process of S53 is VCPU1, the change target identification unit 116 references the GW information 132 described with reference to FIG. 22 and identifies "0 (Mb/s)", which is a value set for "traffic amount" of the information in which "VCPU1" is set for "VCPU ID". For example, in the case where the VCPU identified in the process of S44 is VCPU0 and the application identified in the process of S52 is AP11, the change target identification unit 116 references the application information 131 described with reference to FIG. 21 and identifies "60 (Mb/s)", which is a value set for "traffic amount" of the information in which "VCPU0" is set for "VCPU ID" and "AP11" is set for "app ID". Then, the change target identification unit 116 determines 60 Mb/s, by calculation, which is the sum of 0 Mb/s and 60 Mb/s that are individually identified values.

Subsequently, the change target identification unit 116 determines whether the amount of traffic calculated in the process of S54 exceeds the predetermined threshold (S61).

For example, if the transmission destination of packets transmitted from the application identified in the process of S52 to the VCPU identified in the process of S44 is changed to the VCPU identified in the process in S53, the change target identification unit 116 determines whether the sum of the amounts of traffic of packets that will be transmitted to the VCPU identified in the process of S53 exceeds the predetermined threshold.

As a result, it is determined that the amount of traffic calculated in the process of S54 does not exceed the predetermined threshold (NO in S61), the change target identification unit 116 calculates a value obtained by subtracting the amount of traffic of packets that are transmitted to the VCPU identified in the process of S44 from the application identified in the process of S52 from the amount of traffic of packets that are transmitted to the VCPU identified in the process of S44 (S62).

For example, if it is determined that the amount of traffic calculated in the process of S54 does not exceed the predetermined threshold, the change target identification unit 116 determines to change, to the VCPU identified in the process of S53, the transmission destination of packets transmitted to the VCPU identified in the process of S44 from the application identified in the process of S52. The amount of traffic of packets transmitted to the VCPU identified in the process of S44 is still likely to exceed the predetermined threshold even after the application identified in the process of S52 is moved to the VCPU identified in the process of S53. Therefore, the change target identification unit 116 performs the process of S62 in order to determine whether movement of an application that transmits packets to the VCPU identified in the process of S44 is further to be performed.

For example, in the case where the VCPU identified in the process of S53 is VCPU1 and the sum of amounts of traffic calculated in the process of S54 is 60 Mb/s, the change target identification unit 116 references the GW information 132 described with reference to FIG. 22 and determines that the value of 60 Mb/s is not greater than "100 (Mb/s)", which is a value set for "threshold" of the information in which "VCPU1" is set for "VCPU ID". Therefore, in this case, the change target identification unit 116 further references the GW information 132 described with reference to FIG. 22 and, by calculation, determines "80 (Mb/s)" that is a value obtained by subtracting the value of 60 Mb/s from "140 (Mb/s)", which is a value set for "traffic amount" of the information in which "VCPU0" is set for "VCPU ID".

In this case, as illustrated in the underlined portion in FIG. 23, the change target identification unit 116 updates, among information included in the GW information 132, the value set for "traffic amount" of the information in which "VCPU1" is set for "VCPU ID" to "60 (Mb/s)", which is the amount of traffic calculated in the process of S54. In this case, as indicated in the underlined portion in FIG. 23, the change target identification unit 116 also updates, among information included in the GW information 132, the value set for "traffic amount" of the information in which "VCPU0" is set for "VCPU ID", to "80 (Mb/s)", which is the amount of traffic calculated in the process of S62.

The change target identification unit 116 then determines whether the amount of traffic calculated in the process of S62 exceeds the predetermined threshold (S63).

As a result, if the amount of traffic calculated in the process of S62 does not exceed the predetermined threshold (NO in S63), the change target identification unit 116 determines, as illustrated in FIG. 17, whether all of the VCPUs have been identified in the process of S44 (S73). That is, in this case, the change target identification unit 116 completes movement of an application that transmits packets to the VCPU identified in the process of S44.

For example, in the GW information 132 described with reference to FIG. 23, "80 (Mb/s)" and "100 (Mb/s)" are set for "traffic amount" and "threshold", respectively, in information in which "VCPU ID" is "VCPU0" (information with "item number" of "1"). Therefore, in this case, the change target identification unit 116 determines that the value set for "traffic amount" does not exceed the value set for "threshold", and performs the process of S73 and the subsequent steps.

If it is determined that all of the VCPUs have been identified (YES in S73), the management apparatus 1 terminates the process for process distribution.

However, if it is determined that all of the VCPUs have not been identified (NO in S73), the traffic amount identification unit 113 performs again the process of S44 and the subsequent steps.

In the process of S63, if it is determined that the amount of traffic calculated in the process of S62 exceeds the predetermined threshold (YES in S63), the change target identification unit 116 identifies, as an application left outside of consideration, the application identified in the process of S52 (S64). For example, in this case, the change target identification unit 116 identifies the application identified in the process of S52 as an application that is incapable of being moved from the VCPU identified in the process of S44 to another VCPU.

Similarly, if, in the process of S61, it is determined that the amount of traffic calculated in the process of S54 exceeds the predetermined threshold (YES in S61), the change target identification unit 116 performs the process of S64.

As illustrated in FIG. 17, the change target identification unit 116 determines whether all of the applications that transmit packets to the VCPU identified in the process of S44 have been identified (S71). For example, the change target identification unit 116 determines whether, in the process of S52, identification of all of the applications that transmit packets to the VCPU identified in the process of S44 is complete.

As a result, if it is determined that, in the process of S52, identification of all of the applications that transmit packets to the VCPU identified in the process of S44 is not complete (NO in S72), the app identification unit 115 performs again the process of S51 and the subsequent steps.

However, if it is determined that, in the process of S52, identification of all of the applications that transmit packets to the VCPU identified in the process of S44 is complete (YES in S72), the change target identification unit 116 determines whether, in the process of S44, all of the VCPUs have been identified (S73).

For example, the change target identification unit 116 determines that, in this case, the amount of traffic of packets that are transmitted to the VCPU identified in the process of S44 is unable to become smaller than or equal to the predetermined threshold, and terminates the movement of an application that transmits packets to the VCPU identified in the process of S44.

In this case, the change target identification unit 116 may output, to the operator terminals 5 and the like, information indicating that it is determined that the amount of traffic of packets that are transmitted to the VCPU identified in the process of S44 is unable to become smaller than or equal to the predetermined threshold.

If it is determined that all of the VCPUs have been identified (YES in S73), the management apparatus 1 terminates the process for process distribution.

However, if it is determined that all of the VCPUs have not been identified (NO in S73), the traffic amount identification unit 113 performs again the process of S44 and the subsequent steps.

Figure 18:
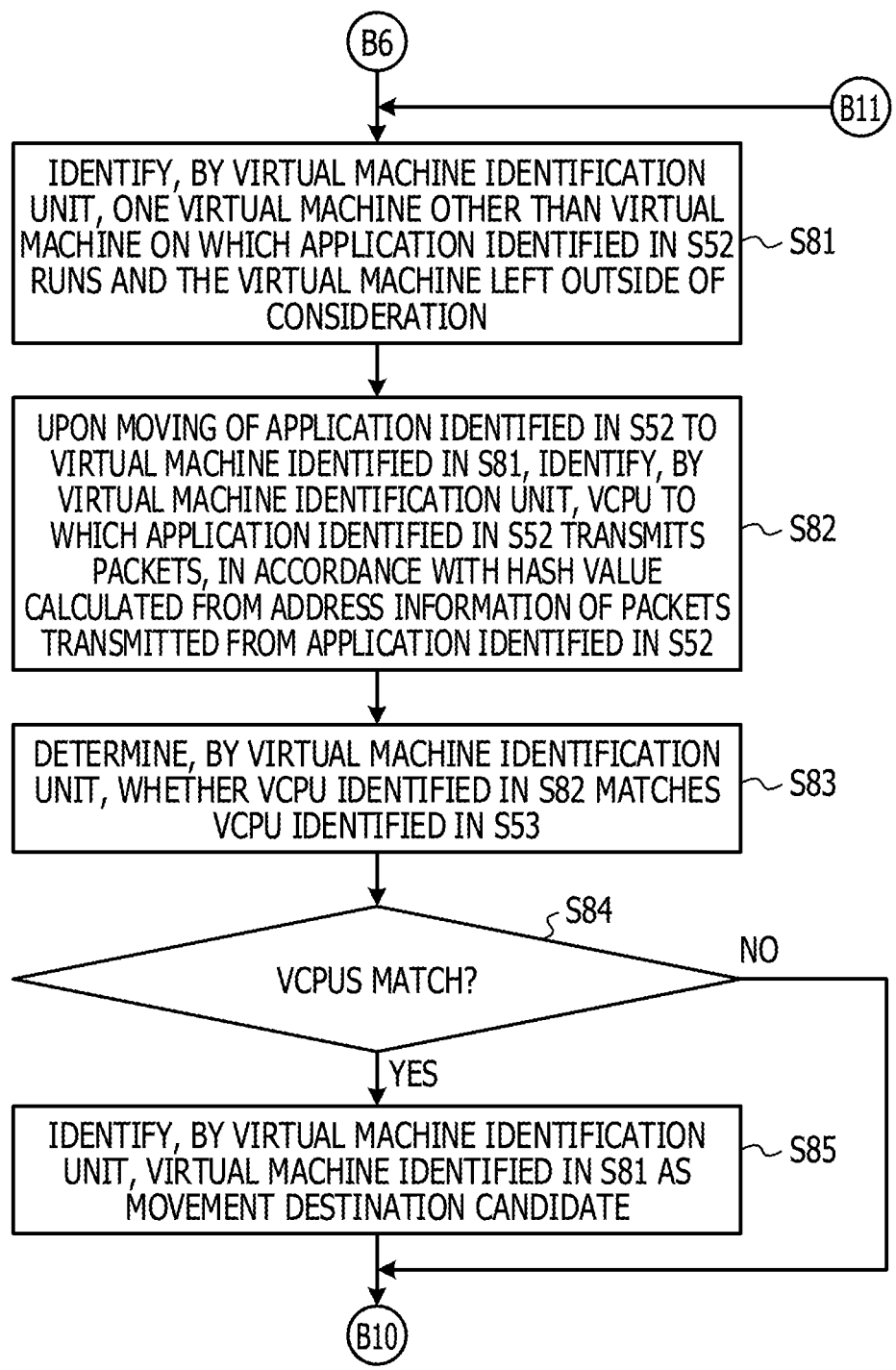
FIG. 18 is a flowchart diagram illustrating details of a process for process distribution in a first embodiment.

In addition, if, in the process of S61, it is determined that the amount of traffic calculated in S54 does not exceed the predetermined threshold (NO in S61), as illustrated in FIG. 18, the virtual machine identification unit 117 of the management apparatus 1 identifies one virtual machine 3 other than the virtual machine 3 on which the application identified in S52 runs and the virtual machine 3 left outside of consideration that is identified in the process of S91 described hereinafter (S81).

For example, if it is determined that the amount of traffic calculated in the process of S54 does not exceed the predetermined threshold, the virtual machine identification unit 117 begins to identify the virtual machine 3 that is the destination of movement of the application identified in the process of S52.

Specifically, for example, in the case where the application identified in the process of S52 is AP11, among the virtual machines 3 on which each application runs, the virtual machines 3 other than the VM 31a on which AP11 is running are identified. Description will be given hereinafter assuming that the virtual machines 3 other than the VM 31a on which AP11 is running are the VM 32a and the VM 33a.

Upon moving of the application identified in the process of S52 to the virtual machine 3 identified in the process of S81, the virtual machine identification unit 117 identifies a VCPU to which the application identified in the process of S52 transmits packets, in accordance with a hash value calculated from address information of packets transmitted from the application identified in the process of S52 (S82).

The virtual machine identification unit 117 then determines whether the VCPU identified in the process of S82 matches the VCPU identified in the process of S53 (S83).

As a result, if it is determined that the VCPU identified in the process of S82 matches the VCPU identified in the process of S53 (YES in S84), the virtual machine identification unit 117 identifies the virtual machine 3 identified in the process of S81 as a movement destination candidate (S85).

For example, upon moving of the application identified in the process of S52, the virtual machine identification unit 117 identifies the virtual machine 3 that allows the transmission destination of packets that are transmitted from the application identified in the process of S52 to be the VCPU identified in the process in S53.

However, if it is determined that the VCPU identified in the process of S82 does not match the VCPU identified in the process of S53 (NO in S84), the virtual machine identification unit 117 does not perform the process of S85.

Figure 19:
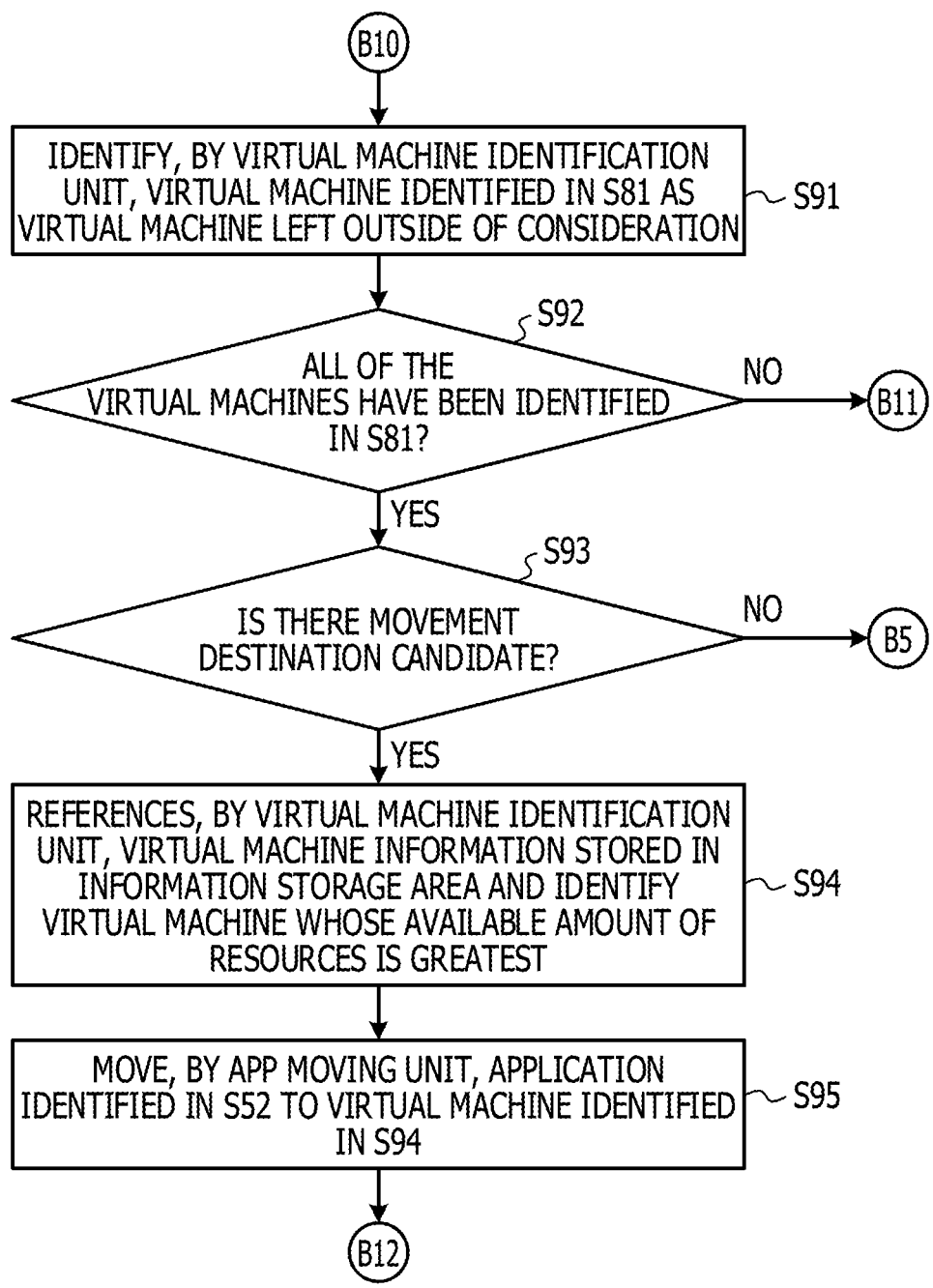
FIG. 19 is a flowchart diagram illustrating details of a process for process distribution in a first embodiment.

Subsequently, as illustrated in FIG. 19, the virtual machine identification unit 117 identifies the virtual machine 3 identified in the process of S81 as the virtual machine 3 left outside of consideration (S91).

The virtual machine identification unit 117 then determines whether, in the process of S81, all of the virtual machines 3 other than the virtual machine 3 on which the application identified in the process of S52 runs have been identified (S92).

As a result, if it is determined that all of the virtual machines 3 other than the virtual machine 3 on which the application identified in the process of S52 runs have not been identified (NO in S92), the virtual machine identification unit 117 performs again the process of S 81 and the subsequent steps.

However, if it is determined that all of the virtual machines 3 other than the virtual machine 3 on which the application identified in the process of S52 runs have been identified (YES in S92), the virtual machine identification unit 117 determines whether there is a movement destination candidate identified in the process of S85 (S93).

As a result, if it is determined that there is no movement destination candidate identified in the process of S85 (NO in S93), the change target identification unit 116 performs again the process of S64 and the subsequent steps.

For example, the virtual machine identification unit 117 determines, in this case, that it is not possible to make the amount of traffic of packets that are transmitted to the VCPU identified in the process of S44 to be smaller than or equal to the predetermined threshold by moving the application identified in the process of S52 to another virtual machine 3.

However, if it is determined that there is a movement destination candidate identified in the process of S85 (YES in S93), the virtual machine identification unit 117 references the virtual machine information 133 stored in the information storage area 130 and identifies the virtual machine 3 whose available amount of resources is greatest (S94).

For example, there are a plurality of movement destination candidates identified in the process of S85, the virtual machine identification unit 117 identifies the virtual machine 3 whose available amount of resources is greatest, as the destination of movement of the application identified in the process of S52.

The app moving unit 118 of the management apparatus 1 then moves the application identified in the process of S52 to the virtual machine 3 identified in the process of S94 (S95). Thereafter, the management apparatus 1 terminates the process for process distribution.

Upon performing of the process of S95, the app moving unit 118 updates the application information 131 and the GW information 132 based on information on the application that has been moved to another virtual machine 3.

For example, in information in which "AP11" is set for "app ID" in the application information 131 illustrated in FIG. 21, "1 (pcs)" is set as "VCPU usage amount" and "0.5 (Mb)" is set as "memory usage amount". Therefore, when AP11 is moved, the VCPU available amount and the memory available amount in the virtual machine 3 serving as the movement destination increase by 1 piece and 0.5 Mb, respectively. In contrast, the VCPU available amount and the memory available amount in the virtual machine 3 serving as the movement source decrease by 1 piece and 0.5 Mb, respectively.

Accordingly, in this case, as indicated in the underlined portions in FIG. 24, the app moving unit 118 updates, among information included in the virtual machine information 133 described with reference to FIG. 20, "VCPU available amount" to "3 (pcs)" and "memory available amount" to "3.5 (Mb)" in the information (information with "item number" of "1") in which "VM 31a", which is the virtual machine 3 serving as the source of movement of AP11, is set for "VM ID". As indicated in the underlined portions in FIG. 24, the app moving unit 118 also updates, among information included in the virtual machine information 133 described with reference to FIG. 20, "VCPU available amount" to "2 (pcs)" and "memory available amount" to "3.5 (Mb)" in the information (information with "item number" of "2") in which "VM 32a", which is the virtual machine 3 serving as the destination of movement of AP11, is set for "VM ID".

Furthermore, in this case, as indicated in the underlined portion in FIG. 25, the app moving unit 118 updates, among information included in the application information 131 described with reference to FIG. 21, "VM ID" to "VM 32a" in the information (information with "item number" of "1") in which "AP11" is set for "app ID".

In such a way, the management apparatus 1 in the present embodiment acquires, at a predetermined interval, for each of a plurality of applications that run on a plurality of virtual machines 3, application information including the amount of traffic of packets that the application transmits to any of a plurality of VCPUs.

For each of the plurality of applications, the management apparatus 1 then identifies, among a plurality of VCPUs, a VCPU to which packets are transmitted from the application, in accordance with a hash value calculated from address information including the transmission source IP address and the transmission destination IP address of packets transmitted from the application. Furthermore, for each of the plurality of VCPUs, the management apparatus 1 calculates an amount of traffic of packets that are received by the VCPU by summing the amounts of traffic corresponding to, among the plurality of applications, one or more applications that transmit packets to the VCPU.

Thereafter, the management apparatus 1 identifies, out of the plurality of VCPUs, a specific VCPU whose calculated amount of traffic exceeds the predetermined threshold, and identifies, among the plurality of applications, a specific application that changes a VCPU to which packets are transmitted, out of one or more applications that transmit packets to the specific VCPU.

The management apparatus 1 then identifies, among the plurality of virtual machines 3, a specific virtual machine 3 with which a VCPU to which the specific application transmits packets is changed when the specific application is moved, and moves the specific application to the identified virtual machine 3.

For example, instead of making a modification or the like to an application that runs on the virtual machine 3, the management apparatus 1 moves the application between the virtual machines 3, thereby changing the hash value for each packet transmitted from the application.

Thus, without making a modification or the like to an application that runs on the virtual machine 3, the management apparatus 1 may change the hash value for each packet transmitted from the application and may appropriately distribute the packets to a plurality of VCPUs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    acquiring, at a predetermined interval, for each of a plurality of applications executed on a plurality of virtual machines, an amount of traffic of packets transmitted to any of a plurality of central computing units (CPUs);
    identifying, for each of the plurality of applications, a CPU to which packets are routed, the CPU to which packets are routed being determined in accordance with a hash value calculated based on a transmission source address and a transmission destination address of each of the packets, the transmission source address varying depending on a virtual machine, among the plurality of virtual machines, on which the application corresponding to each of the packets is executed;
    calculating, for each of the plurality of CPUs, a total amount of traffic of packets that are received by the CPU by summing the amount of the traffic corresponding to one or more applications, among the plurality of applications, that are routed to each of the plurality of CPUs;
    identifying, among the plurality of CPUs, a specific CPU for which the calculated total amount exceeds a predetermined threshold;
    identifying, among applications that have packets routed to the specific CPU, a specific application;
    identifying a specific virtual machine among the plurality of virtual machines for the specific application to change the hash value; and
    moving the specific application to the specific virtual machine.

2. The non-transitory computer-readable storage medium according to claim 1, wherein the specific application is an application whose amount of the traffic is greatest among the applications that have packets routed to the specific CPU.

3. The non-transitory computer-readable storage medium according to claim 1, wherein the identifying the specific application is repeated until the total amount of the specific CPU becomes smaller than or equal to the predetermined threshold.

4. The non-transitory computer-readable storage medium according to claim 1, wherein the process further comprises:
    identifying, among the plurality of CPUs, another CPU in which a difference between the total amount and the predetermined threshold is greater than the amount of the traffic of the specific application; and wherein
    the CPU to which packets are transmitted from the specific application being changed to the another CPU by moving the specific application to the specific virtual machine.

5. The non-transitory computer-readable storage medium according to claim 4, wherein the another CPU is a CPU whose total amount is smallest among the plurality of CPUs in a case where plural CPUs in which a difference between the total amount and the predetermined threshold is greater than amount of the traffic of the specific application are exist.

6. The non-transitory computer-readable storage medium according to claim 1, wherein the process further comprises:
    acquiring a usage amount of resources required for executing each of the plurality of applications; and
    acquiring, at a predetermined interval, for each of the plurality of virtual machines, available amount of resources; and wherein
    the specific virtual machine is a virtual machine of which the available amount of resources greater than the usage amount of resources required for executing the specific application.

7. The non-transitory computer-readable storage medium according to claim 6, wherein the specific virtual machine is a virtual machine of which the available amount is greatest among the plurality of virtual machines in a case where plural virtual machines of which the available amount of resources greater than the usage amount of resources required for executing the specific application are exist.

8. The non-transitory computer-readable storage medium according to claim 1, wherein
    the transmission source address includes a port number from which the packets are transmitted; and wherein
    the transmission destination address is a port number in which the packets are received.

9. The non-transitory computer-readable storage medium according to claim 1, wherein the plurality of CPUs are CPUs assigned to one or more virtual machines functioning as a gateway of a virtual private network (VPN).

10. A process distribution apparatus comprising:
    a memory; and
    a processor coupled to the memory and the processor configured to execute a process, the process including:
    acquiring, at a predetermined interval, for each of a plurality of applications executed on a plurality of virtual machines, an amount of traffic of packets transmitted to any of a plurality of central computing units (CPUs);
    identifying, for each of the plurality of applications, a CPU to which packets are routed, the CPU to which packets are routed being determined in accordance with a hash value calculated based on a transmission source address and a transmission destination address of each of the packets, the transmission source address varying depending on a virtual machine, among the plurality of virtual machines, on which the application corresponding to each of the packets is executed;
    calculating, for each of the plurality of CPUs, a total amount of traffic of packets that are received by the CPU by summing the amount of the traffic corresponding to one or more applications, among the plurality of applications, that are routed to each of the plurality of CPUs;

identifying, among the plurality of CPUs, a specific CPU for which the calculated total amount exceeds a predetermined threshold;

identifying, among applications that have packets routed to the specific CPU, a specific application;

identifying a specific virtual machine among the plurality of virtual machines for the specific application to change the hash value; and moving the specific application to the specific virtual machine.

11. A process distribution method executed by a computer, the process distribution method comprising:

acquiring, at a predetermined interval, for each of a plurality of applications executed on a plurality of virtual machines, an amount of traffic of packets transmitted to any of a plurality of central computing units (CPUs);

identifying, for each of the plurality of applications, a CPU to which packets are routed, the CPU to which packets are routed being determined in accordance with a hash value calculated based on a transmission source address and a transmission destination address of each of the packets, the transmission source address varying depending on a virtual machine, among the plurality of virtual machines, on which the application corresponding to each of the packets is executed;

calculating, for each of the plurality of CPUs, a total amount of traffic of packets that are received by the CPU by summing the amount of the traffic corresponding to one or more applications, among the plurality of applications, that are routed to each of the plurality of CPUs;

identifying, among the plurality of CPUs, a specific CPU for which the calculated total amount exceeds a predetermined threshold;

identifying, among applications that have packets routed to the specific CPU, a specific application;

identifying a specific virtual machine among the plurality of virtual machines, for the specific application to change the hash value; and moving the specific application to the specific virtual machine.

* * * * *